United States Patent
Yamamoto

(10) Patent No.: US 11,870,075 B2
(45) Date of Patent: Jan. 9, 2024

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventor: Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 228 days.

(21) Appl. No.: 16/074,499

(22) PCT Filed: Feb. 8, 2017

(86) PCT No.: PCT/JP2017/004606
§ 371 (c)(1),
(2) Date: Aug. 1, 2018

(87) PCT Pub. No.: WO2017/141791
PCT Pub. Date: Aug. 24, 2017

(65) Prior Publication Data
US 2019/0044148 A1 Feb. 7, 2019

(30) Foreign Application Priority Data
Feb. 17, 2016 (JP) .................................. 2016-027955
Mar. 10, 2016 (JP) .................................. 2016-047444

(51) Int. Cl.
*H01M 4/62* (2006.01)
*C08K 3/04* (2006.01)
*H01M 4/139* (2010.01)
*H01M 4/13* (2010.01)
*C08L 51/04* (2006.01)
*C08F 236/08* (2006.01)
*C08L 9/00* (2006.01)
*H01M 10/0525* (2010.01)
*H01M 10/0566* (2010.01)

(52) U.S. Cl.
CPC .......... *H01M 4/622* (2013.01); *C08F 236/08* (2013.01); *C08K 3/04* (2013.01); *C08L 9/00* (2013.01); *C08L 51/04* (2013.01); *H01M 4/13* (2013.01); *H01M 4/139* (2013.01); *H01M 10/0525* (2013.01); *C08L 2203/20* (2013.01); *H01M 4/624* (2013.01); *H01M 10/0566* (2013.01)

(58) Field of Classification Search
CPC .... H01M 4/622; H01M 4/13; H01M 10/0525; H01M 4/139; H01M 4/624; H01M 10/0566; H01M 10/052; H01M 2300/0025; C08L 51/04; C08L 9/00; C08L 2203/20; C08F 220/18; C08F 236/08; C08F 279/02; C08K 3/04

USPC ........................................................ 429/217
See application file for complete search history.

(56) References Cited

U.S. PATENT DOCUMENTS

| 3,429,952 | A | * | 2/1969 | Karl-Heinz | ............... | C08L 9/00 |
| | | | | | | 524/522 |
| 4,390,597 | A | * | 6/1983 | Chauvel | ................ | C08F 257/02 |
| | | | | | | 428/512 |
| 5,232,972 | A | * | 8/1993 | Sasaki | .................... | C08F 257/02 |
| | | | | | | 525/142 |
| 6,756,153 | B1 | * | 6/2004 | Yamamoto | ............ | H01M 4/622 |
| | | | | | | 429/231.95 |
| 9,834,671 | B2 | * | 12/2017 | Feng | ........................ | C08L 63/00 |
| 9,834,672 | B2 | * | 12/2017 | Ness | ........................ | C08L 69/00 |
| 2002/0177654 | A1 | * | 11/2002 | Erdem | ................. | C08G 18/758 |
| | | | | | | 524/839 |
| 2006/0257739 | A1 | * | 11/2006 | Ryu | ..................... | H01M 10/056 |
| | | | | | | 324/427 |
| 2007/0055023 | A1 | * | 3/2007 | Han | ....................... | H01M 4/622 |
| | | | | | | 524/556 |
| 2011/0034638 | A1 | * | 2/2011 | Satou | ....................... | C08K 3/06 |
| | | | | | | 525/349 |
| 2013/0017402 | A1 | * | 1/2013 | Kobayashi | ............. | D21H 19/20 |
| | | | | | | 428/514 |
| 2013/0330622 | A1 | | 12/2013 | Sasaki et al. | | |
| 2014/0239239 | A1 | * | 8/2014 | Cha | ........................ | H01M 4/134 |
| | | | | | | 252/519.33 |
| 2014/0342226 | A1 | | 11/2014 | Sasaki | | |

(Continued)

FOREIGN PATENT DOCUMENTS

CN 104011919 A 8/2014
CN 104981927 A 10/2015
(Continued)

OTHER PUBLICATIONS

Helmenstine, Mass vs Weight—The Difference Between Mass and Weight, Aug. 2020, see https://sciencenotes.org/mass-vs-weight-the-difference-between-mass-and-weight/ 2020 (Year: 2020).*

(Continued)

*Primary Examiner* — Christian Roldan
(74) *Attorney, Agent, or Firm* — KENJA IP LAW PC

(57) ABSTRACT

Provided is a binder composition for a non-aqueous secondary battery electrode that enables formation of an electrode for a non-aqueous secondary battery that has excellent peel strength and can cause a non-aqueous secondary battery to display excellent cycle characteristics. A binder composition according to a first aspect contains a particulate polymer A1 that includes an aliphatic conjugated diene monomer unit in a proportion of 70 mass % to 99 mass % and a carboxylic acid group-containing monomer unit in a proportion of 1 mass % to 30 mass %. A binder composition according to a second aspect contains a particulate polymer A2 that includes an aliphatic conjugated diene monomer unit in a proportion of 70 mass % to 95 mass % and a (meth)acrylic acid ester monomer unit in a proportion of 1 mass % to 30 mass %, and that has a degree of swelling in electrolyte solution of a factor of 1.2 to 7.0.

16 Claims, No Drawings

(56) References Cited

U.S. PATENT DOCUMENTS

2015/0311490 A1 10/2015 Murase et al.
2015/0368459 A1 12/2015 Yamanaka et al.
2016/0156038 A1 6/2016 Park et al.

FOREIGN PATENT DOCUMENTS

| JP | 2012204303 A | 10/2012 |
| WO | 2012115096 A1 | 8/2012 |
| WO | 2014081035 A1 | 5/2014 |
| WO | 2014189294 A1 | 11/2014 |

OTHER PUBLICATIONS

Zho et al., All the elements of the periodic table that can be used to make batteries, Apr. 2019, see https://qz.com/1585667/the-elements-used-in-batteries-of-the-past-present-and-future/ (Year: 2019).*
Lee et al., Amphiphilic Graft Copolymers as a Versatil Binder for Various Electrodes of High-Performance Lithium-Ion Batteries, 2016, 12, No. 23, 3119-3127, Materials Views (Year: 2016).*
May 31, 2019, the Extended European Search Report issued by the European Patent Office in the corresponding European Patent Application No. 17753049.0.
Aug. 21, 2018, International Preliminary Report on Patentability issued in the International Patent Application No. PCT/JP2017/004606.
May 7, 2021, Communication pursuant to Article 94(3) EPC issued by the European Patent Office in the corresponding European Patent Application No. 17753049.0.
Mar. 24, 2023, Communication pursuant to Article 94(3) EPC issued by the European Patent Office in the corresponding European Patent Application No. 17753049.0.

* cited by examiner

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

This disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. Consequently, in recent years, studies have been made to improve battery members such as electrodes for the purpose of achieving even higher non-aqueous secondary battery performance.

An electrode for a secondary battery, such as a lithium ion secondary battery, normally includes a current collector and an electrode mixed material layer formed on the current collector. The electrode mixed material layer is formed, for example, by applying, onto the current collector, a slurry composition in which an electrode active material, a binder composition containing a binder, and so forth are dispersed in a dispersion medium, and drying the applied slurry composition.

Conventional examples of polymers that can be used as binders for electrodes of secondary batteries include synthetic resins such as polyvinylidene fluoride, acrylic polymers, and diene polymers, and naturals resins such as natural rubber (for example, refer to PTL 1).

CITATION LIST

Patent Literature

PTL 1: WO 2014/081035 A1

SUMMARY

Technical Problem

However, there has been demand for further improvement of secondary battery performance in recent years and there is room for improvement over conventional binder compositions such as described above in terms of increasing peel strength of an electrode produced using a binder composition while also further improving battery characteristics (for example, cycle characteristics) of a non-aqueous secondary battery including the electrode.

Accordingly, an objective of this disclosure is to provide a binder composition for a non-aqueous secondary battery electrode and a slurry composition for a non-aqueous secondary battery electrode that enable formation of an electrode for a non-aqueous secondary battery that has excellent peel strength and can cause a non-aqueous secondary battery to display excellent cycle characteristics.

Another objective of this disclosure is to provide an electrode for a non-aqueous secondary battery that has excellent peel strength and can cause a non-aqueous secondary battery to display excellent cycle characteristics.

Yet another objective of this disclosure is to provide a non-aqueous secondary battery having excellent cycle characteristics.

Solution to Problem

The inventor conducted diligent investigation with the aim of solving the problems set forth above. The inventor discovered that by using a particulate polymer including an aliphatic conjugated diene monomer unit and a carboxylic acid group-containing monomer unit in specific proportions, it is possible to obtain a binder composition for a non-aqueous secondary battery electrode that has excellent binding capacity and can cause a non-aqueous secondary battery to display excellent cycle characteristics. Moreover, the inventor discovered that by using a particulate polymer including an aliphatic conjugated diene monomer unit and a (meth)acrylic acid ester monomer unit in specific proportions, and having a degree of swelling in electrolyte solution within a specific range, it is possible to obtain a binder composition for a non-aqueous secondary battery electrode that has excellent binding capacity and can cause a non-aqueous secondary battery to display excellent cycle characteristics and rate characteristics. The inventor completed this disclosure based on these new discoveries.

Specifically, a binder composition for a non-aqueous secondary battery electrode according to a first aspect of this disclosure, an objective of which is to advantageously solve the problems set forth above, comprises a particulate polymer A1, wherein the particulate polymer A1 includes an aliphatic conjugated diene monomer unit in a proportion of at least 70 mass % and not more than 99 mass % and a carboxylic acid group-containing monomer unit in a proportion of at least 1 mass % and not more than 30 mass %. Through use of a binder composition containing the particulate polymer A1 having a specific make-up as set forth above, it is possible to form an electrode that has excellent peel strength and can cause a non-aqueous secondary battery to display excellent cycle characteristics.

Moreover, a binder composition for a non-aqueous secondary battery electrode according to a second aspect of this disclosure, an objective of which is to advantageously solve the problems set forth above, comprises a particulate polymer A2, wherein the particulate polymer A2 includes an aliphatic conjugated diene monomer unit in a proportion of at least 70 mass % and not more than 95 mass % and a (meth)acrylic acid ester monomer unit in a proportion of at least 1 mass % and not more than 30 mass %, and the particulate polymer A2 has a degree of swelling in electrolyte solution of at least a factor of 1.2 and not more than a factor of 7.0. Through use of a binder composition containing the particulate polymer A2 having a specific make-up and degree of swelling in electrolyte solution as set forth above, it is possible to form an electrode that has excellent peel strength and can cause a non-aqueous secondary battery to display excellent cycle characteristics. Moreover, this electrode can also cause a non-aqueous secondary battery to display excellent rate characteristics.

The "degree of swelling in electrolyte solution" referred to herein can be measured by a measurement method described in the EXAMPLES section of the present specification.

In the binder composition for a non-aqueous secondary battery electrode according to the first aspect of this disclosure, the particulate polymer A1 is preferably a graft copolymer. Through use of a particulate polymer A1 that is a graft copolymer, formation of aggregates due to the particulate polymer A1 can be inhibited, and stability of a slurry composition containing the binder composition can be increased. This can prevent filter clogging when the slurry composition is passed through a filter to remove aggregates and foreign matter.

Moreover, in the binder composition for a non-aqueous secondary battery electrode according to the first aspect of this disclosure, the particulate polymer A1 preferably has a volume average particle diameter of at least 0.6 μm and not more than 2.5 μm. Non-aqueous secondary battery cycle characteristics can be further improved when the particulate polymer A1 has a volume average particle diameter of at least 0.6 μm and not more than 2.5 μm.

The "volume average particle diameter" referred to herein is a particle diameter (D50) at which, in a particle diameter distribution (volume basis) measured by laser diffraction, cumulative volume calculated from a small diameter end of the distribution reaches 50%. The "volume average particle diameter" of various polymers such as the particulate polymer A1 and the particulate polymer A2 can be measured by a measurement method described in the EXAMPLES section of the present specification.

The binder composition for a non-aqueous secondary battery electrode according to the first aspect of this disclosure preferably further comprises a particulate polymer B, wherein the particulate polymer B has a volume average particle diameter of at least 0.01 μm and less than 0.6 μm. By using the particulate polymer B having a volume average particle diameter of at least 0.01 μm and less than 0.6 μm in combination with the particulate polymer A1 set forth above, peel strength of an electrode produced using the binder composition can be further improved, and non-aqueous secondary battery cycle characteristics can be further improved. Combined use of the particulate polymers A1 and B can also improve stability of a slurry composition containing the binder composition.

In the binder composition for a non-aqueous secondary battery electrode according to the first aspect of this disclosure, content of the particulate polymer A1 is preferably at least 50 mass % and not more than 90 mass % of total content of the particulate polymer A1 and the particulate polymer B. By setting the content of the particulate polymer A1 within the range set forth above, electrode peel strength can be further improved while inhibiting reduction of stability of a slurry composition containing the binder composition.

In the binder composition for a non-aqueous secondary battery electrode according to the second aspect of this disclosure, the particulate polymer A2 is preferably a graft copolymer. Through use of a particulate polymer A2 that is a graft copolymer, non-aqueous secondary battery rate characteristics can be further improved. The use of a particulate polymer A2 that is a graft copolymer can also inhibit formation of aggregates due to the particulate polymer A2 and increase stability of a slurry composition containing the binder composition. This can prevent filter clogging when the slurry composition is passed through a filter to remove aggregates and foreign matter.

Moreover, in the binder composition for a non-aqueous secondary battery electrode according to the second aspect of this disclosure, the particulate polymer A2 preferably has a volume average particle diameter of at least 0.6 μm and not more than 2.5 μm. Non-aqueous secondary battery cycle characteristics and rate characteristics can be further improved when the particulate polymer A2 has a volume average particle diameter of at least 0.6 and not more than 2.5 μm.

The binder composition for a non-aqueous secondary battery electrode according to the second aspect of this disclosure preferably further comprises a particulate polymer B, wherein the particulate polymer B has a volume average particle diameter of at least 0.01 μm and less than 0.6 μm. By using the particulate polymer B having a volume average particle diameter of at least 0.01 μm and less than 0.6 μm in combination with the particulate polymer A2 set forth above, peel strength of an electrode produced using the binder composition can be further improved, and non-aqueous secondary battery cycle characteristics and rate characteristics can be further improved. Combined use of the particulate polymers A2 and B can also improve stability of a slurry composition containing the binder composition.

In the binder composition for a non-aqueous secondary battery electrode according to the second aspect of this disclosure, content of the particulate polymer A2 is preferably at least 50 mass % and not more than 90 mass % of total content of the particulate polymer A2 and the particulate polymer B. By setting the content of the particulate polymer A2 within the range set forth above, electrode peel strength can be further improved while inhibiting reduction of stability of a slurry composition containing the binder composition.

Furthermore, a slurry composition for a non-aqueous secondary battery electrode according to this disclosure, an objective of which is to advantageously solve the problems set forth above, comprises: an electrode active material; and any of the binder compositions for a non-aqueous secondary battery electrode set forth above. By including a binder composition containing the particulate polymer A1 or the particulate polymer A2 in a slurry composition in this manner, it is possible to form an electrode that has excellent peel strength and can cause a non-aqueous secondary battery to display excellent cycle characteristics. Moreover, a non-aqueous secondary battery can be caused to display excellent rate characteristics in a case in which a binder composition that contains the particulate polymer A2 is used.

In the slurry composition for a non-aqueous secondary battery electrode according to this disclosure, the electrode active material preferably has a tap density of 1.1 g/cm$^3$ or less. When the electrode active material has a tap density of 1.1 g/cm$^3$ or less, it is possible to form an electrode that is not susceptible to swelling associated with charging and discharging of a non-aqueous secondary battery. Note that although an electrode formed using an electrode active material having a low tap density normally tends to have reduced peel strength, electrode peel strength can be sufficiently improved when a binder composition containing the particulate polymer A1 or the particulate polymer A2 is used.

The "tap density" referred to herein can be measured by a measurement method described in the EXAMPLES section of the present specification.

The slurry composition for a non-aqueous secondary battery electrode according to this disclosure preferably further comprises a conductive material. Non-aqueous secondary battery rate characteristics can be improved when the slurry composition contains a conductive material.

Also, an electrode for a non-aqueous secondary battery according to this disclosure, an objective of which is to advantageously solve the problems set forth above, comprises an electrode mixed material layer formed using any of the slurry compositions for a non-aqueous secondary battery electrode set forth above. An electrode for a non-aqueous secondary battery that has excellent peel strength and can cause a non-aqueous secondary battery to display excellent cycle characteristics can be obtained when an electrode mixed material layer is formed using the slurry composition for a non-aqueous secondary battery electrode set forth above in this manner. Moreover, a non-aqueous secondary battery can be caused to display excellent rate characteristics in a case in which a binder composition that contains the particulate polymer A2 is used.

Moreover, a non-aqueous secondary battery according to this disclosure, an objective of which is to advantageously solve the problems set forth above, comprises: a positive electrode; a negative electrode; an electrolyte solution; and a separator, wherein at least one of the positive electrode and the negative electrode is the electrode for a non-aqueous secondary battery set forth above. Battery characteristics such as cycle characteristics can be sufficiently improved by using the electrode for a non-aqueous secondary battery set forth above in this manner. Moreover, the non-aqueous secondary battery can be caused to display excellent rate characteristics in a case in which a binder composition that contains the particulate polymer A2 is used.

Advantageous Effect

According to this disclosure, it is possible to provide a binder composition for a non-aqueous secondary battery electrode and a slurry composition for a non-aqueous secondary battery electrode that enable formation of an electrode for a non-aqueous secondary battery that has excellent peel strength and can cause a non-aqueous secondary battery to display excellent cycle characteristics.

Moreover, according to this disclosure, it is possible to provide an electrode for a non-aqueous secondary battery that has excellent peel strength and can cause a non-aqueous secondary battery to display excellent cycle characteristics.

Furthermore, according to this disclosure, it is possible to provide a non-aqueous secondary battery having excellent battery characteristics such as cycle characteristics.

DETAILED DESCRIPTION

The following provides a detailed description of embodiments of this disclosure.

A binder composition for a non-aqueous secondary battery electrode according to this disclosure can be used in production of a slurry composition for a non-aqueous secondary battery electrode. Moreover, a slurry composition for a non-aqueous secondary battery electrode produced using the binder composition for a non-aqueous secondary battery electrode according to this disclosure can be used in formation of an electrode of a non-aqueous secondary battery such as a lithium ion secondary battery. Furthermore, a feature of a non-aqueous secondary battery according to this disclosure is that an electrode for a non-aqueous secondary battery formed using the slurry composition for a non-aqueous secondary battery electrode according to this disclosure is used therein.

Note that the binder composition for a non-aqueous secondary battery electrode and the slurry composition for a non-aqueous secondary battery electrode according to this disclosure can suitably be used, in particular, in formation of a negative electrode of a non-aqueous secondary battery.

(Binder Composition for Non-Aqueous Secondary Battery Electrode)

The binder composition for a non-aqueous secondary battery electrode according to this disclosure contains a particulate polymer A1 or a particulate polymer A2 (hereinafter, also referred to collectively as "particulate polymer A"), and may optionally further contain a particulate polymer B and other components that can be used in electrodes of secondary batteries. Moreover, the binder composition for a non-aqueous secondary battery electrode according to this disclosure normally further contains a dispersion medium such as water.

In the case of a binder composition for a non-aqueous secondary battery electrode according to a first aspect of this disclosure, the particulate polymer A1 includes an aliphatic conjugated diene monomer unit in a proportion of at least 70 mass % and not more than 99 mass % and a carboxylic acid group-containing monomer unit in a proportion of at least 1 mass % and not more than 30 mass %.

As a result of the particulate polymer A1 having a specific make-up, the binder composition for a non-aqueous secondary battery electrode according to the first aspect of this disclosure enables good binding amongst an electrode active material and between the electrode active material and a current collector when used in formation of an electrode mixed material layer of an electrode. Accordingly, an electrode having excellent peel strength can be obtained by using the binder composition for a non-aqueous secondary battery electrode according to the first aspect of this disclosure, and a non-aqueous secondary battery can be caused to display excellent battery characteristics, and particularly cycle characteristics, by using an electrode formed using the binder composition containing this particulate polymer A1.

In the case of a binder composition for a non-aqueous secondary battery electrode according to a second aspect of this disclosure, the particulate polymer A2 includes an aliphatic conjugated diene monomer unit in a proportion of at least 70 mass % and not more than 95 mass % and a (meth)acrylic acid ester monomer unit in a proportion of at least 1 mass % and not more than 30 mass %, and has a degree of swelling in electrolyte solution of at least a factor of 1.2 and not more than a factor of 7.0.

As a result of the particulate polymer A2 having a specific make-up, the binder composition for a non-aqueous secondary battery electrode according to the second aspect of this disclosure enables good binding amongst an electrode active material and between the electrode active material and a current collector when used in formation of an electrode mixed material layer of an electrode. In addition, as a result of the particulate polymer A2 having a specific degree of swelling in electrolyte solution, it is possible to inhibit elution of the particulate polymer A2 into electrolyte solution and cutting off of a conduction path by the particulate polymer A2 while also ensuring mobility of charge carriers such as lithium ions and restricting secondary battery resistance to a sufficiently low level. Accordingly, an electrode having excellent peel strength can be obtained by using the binder composition for a non-aqueous secondary battery electrode according to the second aspect of this disclosure, and a non-aqueous secondary battery can be caused to display excellent battery characteristics, and particularly cycle characteristics and rate characteristics, by using an electrode formed using the binder composition containing this particulate polymer A2.

<Particulate Polymer A1>

In an electrode produced by forming an electrode mixed material layer on a current collector using a slurry composition for a non-aqueous secondary battery electrode that is produced using the binder composition, the particulate polymer A1 holds components contained in the electrode mixed material layer so that these components do not become detached from the electrode mixed material layer (i.e., functions as a binder).

[Make-Up of Particulate Polymer A1]

The particulate polymer A1 is required to include an aliphatic conjugated diene monomer unit and a carboxylic acid group-containing monomer unit as repeating units, and may optionally further include monomer units other than the aliphatic conjugated diene monomer unit and the carboxylic acid group-containing monomer unit (hereinafter, also referred to as "other monomer units").

[[Aliphatic Conjugated Diene Monomer Unit]]

Examples of aliphatic conjugated diene monomers that may be used to form the aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene and isoprene are preferable, and isoprene is more preferable. One aliphatic conjugated diene monomer may be used individually, or two or more aliphatic conjugated diene monomers may be used in combination in a freely selected ratio.

The proportion constituted by the aliphatic conjugated diene monomer unit in the particulate polymer A1 when the amount of all repeating units in the particulate polymer A1 is taken to be 100 mass % is required to be at least 70 mass % and not more than 99 mass %, is preferably 75 mass % or more, more preferably 76 mass % or more, even more preferably 82 mass % or more, and particularly preferably 90 mass % or more, and is preferably 98 mass % or less, more preferably 97 mass % or less, and even more preferably 95 mass % or less. Setting the percentage content of the aliphatic conjugated diene monomer unit as at least the lower limit of any of the ranges set forth above can improve peel strength of an electrode produced using the binder composition, whereas setting the percentage content of the aliphatic conjugated diene monomer unit as not more than the upper limit of any of the ranges set forth above can improve secondary battery cycle characteristics.

An aliphatic conjugated diene monomer can normally form at least cis-1,4-bonded, trans-1,4-bonded, and vinyl-bonded monomer units through polymerization reaction. In one specific example, 1,3-butadiene can normally form cis-1,4-bonded, trans-1,4-bonded, and 1,2-bonded (vinyl-bonded) monomer units through polymerization reaction. In another example, isoprene can normally form cis-1,4-bonded and trans-1,4-bonded monomer units, and also 1,2-bonded and 3,4-bonded (vinyl-bonded) monomer units through polymerization reaction. In the aliphatic conjugated diene monomer unit of the particulate polymer A1, the proportion of cis-1,4-bonding is preferably 50 mol % to 100 mol %, more preferably 55 mol % or more, even more preferably 60 mol % or more, further preferably 95 mol % or more, and particularly preferably 99 mol % or more. When the proportion of cis-1,4-bonded monomer units among aliphatic conjugated diene monomer units (100 mol %) of the particulate polymer A1 is at least the lower limit of any of the ranges set forth above, peel strength of an electrode produced using the binder composition can be further improved, and cycle characteristics of a secondary battery in which the electrode is used can be further improved. Note that the proportion of cis-1,4-bonded monomer units among aliphatic conjugated diene monomer units can be determined in accordance with the IR method of JIS K6239.

[[Carboxylic Acid Group-Containing Monomer Unit]]

Examples of carboxylic acid group-containing monomers that may be used to form the carboxylic acid group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of dicarboxylic acid derivatives include methyl maleic acid, dimethyl maleic acid, phenyl maleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic anhydride, methyl maleic anhydride, and dimethyl maleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate. Of these carboxylic acid group-containing monomers, acrylic acid and methacrylic acid are preferable. One carboxylic acid group-containing monomer may be used individually, or two or more carboxylic acid group-containing monomers may be used in combination in a freely selected ratio.

The proportion constituted by the carboxylic acid group-containing monomer unit in the particulate polymer A1 when the amount of all repeating units in the particulate polymer A1 is taken to be 100 mass % is required to be at least 1 mass % and not more than 30 mass %, is preferably 2 mass % or more, and more preferably 3 mass % or more, and is preferably 26 mass % or less, more preferably 25 mass % or less, and even more preferably 20 mass % or less. Setting the percentage content of the carboxylic acid group-containing monomer unit as at least the lower limit of any of the ranges set forth above can improve stability of a slurry composition containing the binder composition, whereas setting the percentage content of the carboxylic acid group-containing monomer unit as not more than the upper limit of any of the ranges set forth above can increase peel strength of an electrode produced using the binder composition and improve cycle characteristics of a secondary battery in which the electrode is used.

[[Other Monomer Units]]

Examples of monomer units other than the above-described aliphatic conjugated diene monomer unit and carboxylic acid group-containing monomer unit that may be included in the particulate polymer A1 include, but are not specifically limited to, repeating units derived from known monomers that are copolymerizable with the above-described aliphatic conjugated diene monomers and carboxylic acid group-containing monomers. Specific examples of such other monomer units include, but are not specifically limited to, an aromatic vinyl monomer unit, a (meth)acrylic acid ester monomer unit, and a hydrophilic group-containing monomer unit other than a carboxylic acid group-containing monomer unit. In this disclosure, "(meth)acryl" is used to indicate "acryl" and/or "methacryl".

One of such monomers may be used individually, or two or more of such monomers may be used in combination.

Examples of aromatic vinyl monomers that may be used to form the aromatic vinyl monomer unit include styrene, styrene sulfonic acid and salts thereof, α-methylstyrene, butoxystyrene, and vinylnaphthalene.

Examples of (meth)acrylic acid ester monomers that may be used to form the (meth)acrylic acid ester monomer unit include alkyl esters of acrylic acid such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl esters of methacrylic acid such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that may be used to form the hydrophilic group-containing monomer unit include polymerizable monomers having a hydrophilic group other than a carboxylic acid group. Specific examples of hydrophilic group-containing monomers include sulfonate group-containing monomers, phosphate group-containing monomers, and hydroxy group-containing monomers.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methylpropane sulfonic acid, and 3-allyloxy-2-hydroxypropane sulfonic acid.

In this disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In this disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The percentage content of other monomer units in the particulate polymer A1 is preferably 0 mass % to less than 10 mass %, more preferably 8 mass % or less, and even more preferably 5 mass % or less. When the percentage content of other monomer units is less than 10 mass %, reduction in stability of a slurry composition containing the binder composition can be inhibited.

[[Properties of Particulate Polymer A1]]

The structure of the particulate polymer A1 according to the first aspect of this disclosure is not specifically limited and may, for example, be that of a block copolymer, graft copolymer, or random copolymer. However, the particulate polymer A1 according to the first aspect of this disclosure is preferably a graft copolymer having a structure in which a polymer forming a graft portion is bonded to a polymer forming a trunk portion. It is presumed that in a case in which the particulate polymer A1 is a graft copolymer, the formation of aggregates of the particulate polymer A1 and of the particulate polymer A1 and other components can be inhibited, and stability of a slurry composition containing the binder composition can be improved as a result of surface contact amongst the particulate polymer A1 and between the particulate polymer A1 and other components being physically restricted by the graft portion.

In a case in which the particulate polymer A1 is a graft copolymer, the graft portion of the particulate polymer A1 preferably includes a carboxylic acid group-containing monomer unit, and is more preferably composed of only carboxylic acid group-containing monomer units. Through inclusion of a carboxylic acid group-containing monomer unit in the graft portion, an electric double layer is formed in a surface portion of the particulate polymer A1, and the formation of aggregates can be further inhibited.

Moreover, in a case in which the particulate polymer A1 is a graft copolymer, the proportion constituted by the graft portion in the particulate polymer A1 when the amount of all repeating units in the particulate polymer A1 (total amount of trunk portion and graft portion) is taken to be 100 mass % is preferably 1 mass % or more, and more preferably 2 mass % or more, and is preferably 30 mass % or less, more preferably 25 mass % or less, and even more preferably 20 mass % or less. Setting the percentage content of the graft portion within any of the ranges set forth above enables further improvement of electrode peel strength and secondary battery cycle characteristics while also increasing stability of a slurry composition containing the binder composition.

The volume average particle diameter of the particulate polymer A1 is preferably 0.6 μm or more, more preferably 0.7 μm or more, and even more preferably 0.8 μm or more, and is preferably 2.5 μm or less, more preferably 2.0 μm or less, and even more preferably 1.5 μm or less. When the volume average particle diameter of the particulate polymer A1 is at least the lower limit of any of the ranges set forth above, peel strength of an electrode produced using the binder composition can be further improved. Moreover, when the volume average particle diameter of the particulate polymer A1 is not more than the upper limit of any of the ranges set forth above, peel strength of an electrode produced using the binder composition can be further improved while also further improving cycle characteristics of a secondary battery including the electrode.

Note that the volume average particle diameter of the particulate polymer A1 may be adjusted as appropriate. For example, in a case in which the particulate polymer A1 is a graft copolymer such as previously described, the volume average particle diameter of the particulate polymer A1 is slightly influenced by the graft portion but, normally, is mainly dependent on the volume average particle diameter of the polymer forming the trunk portion. Accordingly, in a case in which natural rubber is used as the polymer forming the trunk portion, the volume average particle diameter of the particulate polymer A1 can be adjusted by adjusting the volume average particle diameter of the natural rubber through sedimentation, classification, or the like. On the other hand, in a case in which a polymer obtained through artificial polymerization is used as the polymer forming the trunk portion, the volume average particle diameter of the particulate polymer A1 can be adjusted by adjusting the volume average particle diameter of the used polymer through polymerization conditions such as the amount of emulsifier that is used.

[[Production Method of Particulate Polymer A1]]

The method by which the particulate polymer A1 is produced is not specifically limited and may be a known method. For example, in a case in which the particulate polymer A1 is a random copolymer, the particulate polymer A1 may be obtained by carrying out polymerization of a monomer composition containing monomers such as previously described by a known method, and in a case in which the particulate polymer A1 is a graft copolymer, the particulate polymer A1 may be obtained by grafting a polymer that forms a graft portion with respect to a polymer that forms a trunk portion by a known method.

Examples of methods by which a graft portion may be grafted with respect to a polymer forming a trunk portion in production of a particulate polymer A1 that is a graft copolymer include, but are not specifically limited to, a method in which polymerization of a monomer composition containing monomers such as previously described is carried out on the polymer forming the trunk portion and a method in which a macromer obtained through polymerization of a monomer composition containing monomers such as previously described is caused to bond to the polymer forming the trunk portion. Moreover, the polymer forming the trunk portion of the particulate polymer A1 that is a graft copolymer may be a polymer that is produced through artificial polymerization of a monomer composition containing monomers such as previously described, or may be natural rubber. Of these polymers, natural rubber is preferable as the polymer forming the trunk portion from a viewpoint of further improving electrode peel strength and secondary battery cycle characteristics. In other words, the particulate polymer A1 is preferably a graft copolymer that is produced by carrying out graft polymerization with respect to natural rubber.

In this disclosure, it is possible to confirm that a graft copolymer is obtained by the previously described methods through comparison of the volume average particle diameter of the polymer forming the trunk portion prior to grafting of the graft portion (i.e., prior to graft polymerization) and the volume average particle diameter of the obtained graft copolymer. More specifically, grafting of a graft portion by graft polymerization is considered to have occurred when a volume average particle diameter ratio Δd determined by the following equation is 1.01 or more.

$$\Delta d = \text{Volume average particle diameter } d1 \text{ of graft copolymer/Volume average particle diameter } d0 \text{ of polymer forming trunk portion}$$

Note that in a situation in which a monomer composition is artificially polymerized to produce the particulate polymer A1 or the polymer forming the trunk portion of the particulate polymer A1, the proportions of monomers in the monomer composition are normally the same as the proportions of monomer units in the target polymer. No specific limitations are placed on the mode of polymerization of these polymers. For example, any of solution polymerization, suspension polymerization, bulk polymerization, and emulsion polymerization may be used. Moreover, the polymerization reaction may be addition polymerization such as ionic polymerization, radical polymerization, or living radical polymerization. Furthermore, an emulsifier, dispersant, polymerization initiator, polymerization aid, or the like used in polymerization may be the same as typically used, and the amount thereof may also be the same as typically used.

<Particulate Polymer A2>

In an electrode produced by forming an electrode mixed material layer on a current collector using a slurry composition for a non-aqueous secondary battery electrode that is produced using the binder composition, the particulate polymer A2 holds components contained in the electrode mixed material layer so that these components do not become detached from the electrode mixed material layer (i.e., functions as a binder) in the same way as the particulate polymer A1.

[Make-Up of Particulate Polymer A2]

The particulate polymer A2 is required to include an aliphatic conjugated diene monomer unit and a (meth)acrylic acid ester monomer unit as repeating units, and may optionally further include monomer units other than the aliphatic conjugated diene monomer unit and the (meth)acrylic acid ester monomer unit (hereinafter, also referred to as "other monomer units").

[[Aliphatic Conjugated Diene Monomer Unit]]

Examples of aliphatic conjugated diene monomers that may be used to form the aliphatic conjugated diene monomer unit include, but are not specifically limited to, the same aliphatic conjugated diene monomers as may be used to form the aliphatic conjugated diene monomer unit of the previously described particulate polymer A1. Of these aliphatic conjugated diene monomers, 1,3-butadiene and isoprene are preferable. One aliphatic conjugated diene monomer may be used individually, or two or more aliphatic conjugated diene monomers may be used in combination in a freely selected ratio.

The proportion constituted by the aliphatic conjugated diene monomer unit in the particulate polymer A2 when the amount of all repeating units in the particulate polymer A2 is taken to be 100 mass % is required to be at least 70 mass % and not more than 95 mass %, is preferably 75 mass % or more, and more preferably 76 mass % or more, and is preferably 90 mass % or less, and more preferably 85 mass % or less. Setting the percentage content of the aliphatic conjugated diene monomer unit as at least the lower limit of any of the ranges set forth above can improve peel strength of an electrode produced using the binder composition, whereas setting the percentage content of the aliphatic conjugated diene monomer unit as not more than the upper limit of any of the ranges set forth above can improve secondary battery cycle characteristics.

An aliphatic conjugated diene monomer can normally form at least cis-1,4-bonded, trans-1,4-bonded, and vinyl-bonded monomer units through polymerization reaction. In one specific example, 1,3-butadiene can normally form cis-1,4-bonded, trans-1,4-bonded, and 1,2-bonded (vinyl-bonded) monomer units through polymerization reaction. In another example, isoprene can normally form cis-1,4-bonded and trans-1,4-bonded monomer units, and also 1,2-bonded and 3,4-bonded (vinyl-bonded) monomer units through polymerization reaction. In the aliphatic conjugated diene monomer unit of the particulate polymer A2, the proportion of cis-1,4-bonding is preferably 50 mol % to 100 mol %, more preferably 55 mol % or more, even more preferably 60 mol % or more, further preferably 95 mol % or more, and particularly preferably 99 mol % or more. When the proportion of cis-1,4-bonded monomer units among aliphatic conjugated diene monomer units (100 mol %) of the particulate polymer A2 is at least the lower limit of any of the ranges set forth above, peel strength of an electrode produced using the binder composition can be further improved, and cycle characteristics and rate characteristics of a secondary battery in which the electrode is used can be further improved.

[[(Meth)Acrylic Acid Ester Monomer Unit]]

Examples of (meth)acrylic acid ester monomers that may be used form the (meth)acrylic acid ester monomer unit include the same (meth)acrylic acid ester monomers as may be used to form a (meth)acrylic acid ester monomer unit of the previously described particulate polymer A1. Of these (meth)acrylic acid ester monomers, methyl methacrylate and ethyl acrylate are preferable. One (meth)acrylic acid ester monomer may be used individually, or two or more (meth) acrylic acid ester monomers may be used in combination in a freely selected ratio.

The proportion constituted by the (meth)acrylic acid ester monomer unit in the particulate polymer A2 when the amount of all repeating units in the particulate polymer A2 is taken to be 100 mass % is required to be at least 1 mass % and not more than 30 mass %, is preferably 5 mass % or more, more preferably 8 mass % or more, and even more preferably 10 mass % or more, and is preferably 26 mass % or less, and more preferably 25 mass % or less. Setting the percentage content of the (meth)acrylic acid ester monomer unit as at least the lower limit of any of the ranges set forth above can improve secondary battery rate characteristics, whereas setting the percentage content of the (meth)acrylic acid ester monomer unit as not more than the upper limit of any of the ranges set forth above can improve secondary battery cycle characteristics.

[[Other Monomer Units]]

Examples of monomer units other than the above-described aliphatic conjugated diene monomer unit and (meth) acrylic acid ester monomer unit that may be included in the particulate polymer A2 include, but are not specifically limited to, repeating units derived from known monomers that are copolymerizable with the above-described aliphatic conjugated diene monomers and (meth)acrylic acid ester monomers. Specific examples of such other monomer units include, but are not specifically limited to, an aromatic vinyl monomer unit and a hydrophilic group-containing monomer unit.

One of such monomers may be used individually, or two or more of such monomers may be used in combination.

Examples of aromatic vinyl monomers that may be used to form the aromatic vinyl monomer unit include the same aromatic vinyl monomers as may be used to form an aromatic vinyl monomer unit of the previously described particulate polymer A1.

Examples of hydrophilic group-containing monomers that may be used to form the hydrophilic group-containing monomer unit include polymerizable monomers having a hydrophilic group. Specific examples of hydrophilic group-containing monomers include carboxylic acid group-containing monomers, sulfonate group-containing monomers, phosphate group-containing monomers, and hydroxy group-containing monomers.

Examples of carboxylic acid group-containing monomers, sulfonate group-containing monomers, phosphate group-containing monomers, and hydroxy group-containing monomers that may be used include the same carboxylic acid group-containing monomers, sulfonate group-containing monomers, phosphate group-containing monomers, and hydroxy group-containing monomers as may be used to respectively form a carboxylic acid group-containing monomer unit, a sulfonate group-containing monomer unit, a phosphate group-containing monomer unit, and a hydroxy group-containing monomer unit of the previously described particulate polymer A1.

The percentage content of other monomer units in the particulate polymer A2 when the amount of all repeating units in the particulate polymer A2 is taken to be 100 mass % is preferably 0 mass % to less than 15 mass %, more preferably 10 mass % or less, and even more preferably 8 mass % or less. When the percentage content of other monomer units is less than 15 mass %, reduction in stability of a slurry composition containing the binder composition can be inhibited.

[[Properties of Particulate Polymer A2]]

The structure of the particulate polymer A2 according to the second aspect of this disclosure is not specifically limited and may, for example, be that of a block copolymer, graft copolymer, or random copolymer. However, the particulate polymer A2 according to the second aspect of this disclosure is preferably a graft copolymer having a structure in which a polymer forming a graft portion is bonded to a polymer forming a trunk portion. It is presumed that in a case in which the particulate polymer A2 is a graft copolymer, the formation of aggregates of the particulate polymer A2 and of the particulate polymer A2 and other components can be inhibited, and stability of a slurry composition containing the binder composition can be improved as a result of surface contact amongst the particulate polymer A2 and between the particulate polymer A2 and other components being physically restricted by the graft portion.

In a case in which the particulate polymer A2 is a graft copolymer, the graft portion of the particulate polymer A2 preferably includes a (meth)acrylic acid ester monomer unit, and is more preferably composed of only (meth)acrylic acid ester monomer units. Through inclusion of a (meth)acrylic acid ester monomer unit in the graft portion, the glass transition temperature of a surface layer portion of the particulate polymer A2 can be increased and the formation of aggregates can be further inhibited while also increasing the degree of swelling in electrolyte solution of the surface layer portion and facilitating migration of charge carriers such as lithium ions. Consequently, stability of a slurry composition containing the binder composition can be further improved while also further improving secondary battery rate characteristics.

Moreover, in a case in which the particulate polymer A2 is a graft copolymer, the proportion constituted by the graft portion in the particulate polymer A2 when the amount of all repeating units in the particulate polymer A2 (total amount of trunk portion and graft portion) is taken to be 100 mass % is preferably 1 mass % or more, more preferably 5 mass % or more, and even more preferably 10 mass % or more, and is preferably 30 mass % or less, and more preferably 28 mass % or less. Setting the percentage content of the graft portion within any of the ranges set forth can improve electrode peel strength and secondary battery rate characteristics and cycle characteristics in a good balance while also increasing stability of a slurry composition containing the binder composition.

The volume average particle diameter of the particulate polymer A2 is preferably 0.6 μm or more, more preferably 0.7 μm or more, and even more preferably 0.8 μm or more, and is preferably 2.5 μm or less, more preferably 2.0 μm or less, and even more preferably 1.5 μm or less. When the volume average particle diameter of the particulate polymer A2 is at least the lower limit of any of the ranges set forth above, peel strength of an electrode produced using the binder composition can be further improved. Moreover, when the volume average particle diameter of the particulate polymer A2 is not more than the upper limit of any of the ranges set forth above, peel strength of an electrode produced using the binder composition can be further improved while also further improving cycle characteristics and rate characteristics of a secondary battery including the electrode.

Note that the volume average particle diameter of the particulate polymer A2 can be adjusted as appropriate. For example, in a case in which the particulate polymer A2 is a graft copolymer such as previously described, the volume average particle diameter of the particulate polymer A2 is slightly influenced by the graft portion but, normally, is mainly dependent on the volume average particle diameter of the polymer forming the trunk portion. Accordingly, in a case in which natural rubber is used as the polymer forming the trunk portion, the volume average particle diameter of the particulate polymer A2 can be adjusted by adjusting the volume average particle diameter of the natural rubber through sedimentation, classification, or the like. On the other hand, in a case in which a polymer obtained through artificial polymerization is used as the polymer forming the trunk portion, the volume average particle diameter of the particulate polymer A2 can be adjusted by adjusting the volume average particle diameter of the used polymer through polymerization conditions such as the amount of emulsifier that is used.

The degree of swelling in electrolyte solution of the particulate polymer A2 is required to be at least a factor of 1.2 and not more than a factor of 7.0, is preferably a factor of 2.0 or more, and more preferably a factor of 3.5 or more, and is preferably a factor of 6.8 or less, and more preferably a factor of 6.5 or less. When the degree of swelling in electrolyte solution of the particulate polymer A2 is at least the lower limit of any of the ranges set forth above, secondary battery rate characteristics can be further improved. On the other hand, when the degree of swelling in electrolyte solution of the particulate polymer A2 is not more than the upper limit of any of the ranges set forth above, secondary battery cycle characteristics can be ensured by inhibiting elution of the particulate polymer A2 into electrolyte solution, and secondary battery rate characteristics can be ensured without excessive swelling of the particulate polymer A2 causing the cut off of a conduction path formed by an electrode active material and/or conductive material.

The degree of swelling in electrolyte solution of the particulate polymer A2 can be adjusted by altering the make-up of the particulate polymer A2. For example, the degree of swelling in electrolyte solution of the particulate polymer A2 can be increased by increasing the percentage content of the (meth)acrylic acid ester monomer unit.

[[Production Method of Particulate Polymer A2]]

The method by which the particulate polymer A2 is produced is not specifically limited and may be a known method. For example, in a case in which the particulate polymer A2 is a random copolymer, the particulate polymer A2 may be obtained by carrying out polymerization of a monomer composition containing monomers such as previously described by a known method, and in a case in which the particulate polymer A2 is a graft copolymer, the particulate polymer A2 may be obtained by grafting a polymer that forms a graft portion with respect to a polymer that forms a trunk portion by a known method.

Examples of methods by which a graft portion may be grafted with respect to a polymer forming a trunk portion in production of a particulate polymer A2 that is a graft copolymer include, but are not specifically limited to, a method in which polymerization of a monomer composition containing monomers such as previously described is carried out on the polymer forming the trunk portion and a method in which a macromer obtained through polymerization of a monomer composition containing monomers such as previously described is caused to bond to the polymer forming the trunk portion. Moreover, the polymer forming the trunk portion of the particulate polymer A2 that is a graft copolymer may be a polymer that is produced through artificial polymerization of a monomer composition containing monomers such as previously described, or may be natural rubber. Of these polymers, natural rubber is preferable as the polymer forming the trunk portion from a viewpoint of further improving electrode peel strength and secondary battery cycle characteristics and rate characteristics. In other words, the particulate polymer A2 is preferably a graft copolymer that is produced by carrying out graft polymerization with respect to natural rubber.

Note that in a situation in which a monomer composition is artificially polymerized to produce the particulate polymer A2, the polymer forming the trunk portion of the particulate polymer A2, or the like, the proportions of monomers in the monomer composition are normally the same as the proportions of monomer units in the target polymer. No specific limitations are placed on the mode of polymerization of these polymers. For example, any of solution polymerization, suspension polymerization, bulk polymerization, and emulsion polymerization may be used. Moreover, the polymerization reaction may be addition polymerization such as ionic polymerization, radical polymerization, or living radical polymerization. Furthermore, an emulsifier, dispersant, polymerization initiator, polymerization aid, or the like used in polymerization may be the same as typically used, and the amount thereof may also be the same as typically used.

<Particulate Polymer B>

In an electrode produced by forming an electrode mixed material layer on a current collector using a slurry composition for a non-aqueous secondary battery electrode that is produced using the binder composition, the particulate polymer B holds components contained in the electrode mixed material layer so that these components do not become detached from the electrode mixed material layer (i.e., functions as a binder in conjunction with the previously described particulate polymer A1 or particulate polymer A2).

[Make-Up of Particulate Polymer B]

Although no specific limitations are placed on the make-up of the particulate polymer B, it is preferable that the particulate polymer B includes an aliphatic conjugated diene monomer unit as a repeating unit. The particulate polymer B including an aliphatic conjugated diene monomer unit in this manner may optionally further contain either or both of an aromatic vinyl monomer unit and a monomer unit other than the aliphatic conjugated diene monomer unit and the aromatic vinyl monomer unit (hereinafter, also referred to as an "optional monomer unit"). It is preferable that the particulate polymer B includes an aliphatic conjugated diene monomer unit and an aromatic vinyl monomer unit.

[[Aliphatic Conjugated Diene Monomer Unit]]

Examples of aliphatic conjugated diene monomers that may be used to form the aliphatic conjugated diene monomer unit of the particulate polymer B include the same aliphatic conjugated diene monomers as may be used to form the aliphatic conjugated diene monomer unit of the previously described particulate polymer A. Of these aliphatic conjugated diene monomers, 1,3-butadiene and isoprene are preferable, and 1,3-butadiene is more preferable as the aliphatic conjugated diene monomer forming the aliphatic conjugated diene monomer unit of the particulate polymer B. One aliphatic conjugated diene monomer may be used individually, or two or more aliphatic conjugated diene monomers may be used in combination in a freely selected ratio.

The proportion constituted by the aliphatic conjugated diene monomer unit in the particulate polymer B when the amount of all repeating units in the particulate polymer B is taken to be 100 mass % is preferably 20 mass % or more, more preferably 25 mass % or more, and even more preferably 30 mass % or more, and is preferably 60 mass % or less, more preferably 55 mass % or less, and even more preferably 50 mass % or less. Setting the percentage content of the aliphatic conjugated diene monomer unit as at least the lower limit of any of the ranges set forth above can further improve peel strength of an electrode produced using the binder composition, whereas setting the percentage content of the aliphatic conjugated diene monomer unit as not more than the upper limit of any of the ranges set forth above can further improve cycle characteristics of a secondary battery including an electrode produced using the binder composition.

[[Aromatic Vinyl Monomer Unit]]

Examples of aromatic vinyl monomers that may be used to form the aromatic vinyl monomer unit of the particulate polymer B include the same aromatic vinyl monomers as may be used to form other monomer units of the previously described particulate polymer A1. Of these aromatic vinyl monomers, styrene and salts of styrene sulfonic acid are preferable, and styrene is more preferable as the aromatic vinyl monomer forming the aromatic vinyl monomer unit of the particulate polymer B. One aromatic vinyl monomer may be used individually, or two or more aromatic vinyl monomers may be used in combination in a freely selected ratio.

The proportion constituted by the aromatic vinyl monomer unit in the particulate polymer B is preferably 10 mass % or more, more preferably 15 mass % or more, and even more preferably 20 mass % or more, and is preferably 70 mass % or less, more preferably 68 mass % or less, and even more preferably 65 mass % or less. Setting the percentage content of the aromatic vinyl monomer unit as at least the lower limit of any of the ranges set forth above can further improve cycle characteristics of a secondary battery including an electrode produced using the binder composition, whereas setting the percentage content of the aromatic vinyl monomer unit as not more than the upper limit of any of the ranges set forth above can further improve peel strength of an electrode produced using the binder composition.

[[Optional Monomer Units]]

Examples of optional monomer units other than the above-described aliphatic conjugated diene monomer unit and aromatic vinyl monomer unit that may be included in the particulate polymer B include, but are not specifically limited to, repeating units derived from known monomers that are copolymerizable with the above-described aliphatic conjugated diene monomers and aromatic vinyl monomers. Specific examples of optional monomer units include, but are not specifically limited to, a hydrophilic group-containing monomer unit and a (meth)acrylic acid ester monomer unit.

One of such monomers may be used individually, or two or more of such monomers may be used in combination.

Examples of hydrophilic group-containing monomers and (meth)acrylic acid ester monomers that may be used to form the hydrophilic group-containing monomer unit and the (meth)acrylic acid ester monomer unit of the particulate polymer B include the same carboxylic acid group-containing monomers as may be used to form a carboxylic acid group-containing monomer unit and hydrophilic group-containing monomers other than carboxylic acid group-containing monomers that may be used to form other monomer units of the previously described particulate polymer A1, and the same (meth)acrylic acid ester monomers as may be used to form a (meth)acrylic acid ester monomer unit of the previously described particulate polymer A1. Of these hydrophilic group-containing monomers, carboxylic acid group-containing monomers and hydroxy group-containing monomers are preferable as hydrophilic group-containing monomers that may form a hydrophilic group-containing monomer unit of the particulate polymer B. Moreover, itaconic acid is preferable as a carboxylic acid group-containing monomer and 2-hydroxyethyl acrylate is preferable as a hydroxy group-containing monomer. Furthermore, methyl methacrylate and 2-ethylhexyl acrylate are preferable as (meth)acrylic acid ester monomers that may form a (meth)acrylic acid ester monomer unit.

The percentage content of optional monomer units in the particulate polymer B is preferably 0 mass % to not more than 10 mass %, more preferably 7 mass % or less, and even more preferably 5 mass % or less.

[Volume Average Particle Diameter]

The volume average particle diameter of the particulate polymer B is required to be at least 0.01 µm and less than 0.6 µm, is preferably 0.05 µm or more, and more preferably 0.1 µm or more, and is preferably 0.5 µm or less, more preferably 0.4 µm or less, and even more preferably 0.3 µm or less. When the volume average particle diameter of the particulate polymer B is 0.01 µm or more, reduction in stability of a slurry composition containing the binder composition can be inhibited. Moreover, when the volume average particle diameter of the particulate polymer B is less than 0.6 μm, peel strength of an electrode produced using the binder composition can be sufficiently improved while also sufficiently improving cycle characteristics and rate characteristics of a secondary battery including the electrode.

The volume average particle diameter of the particulate polymer B can be adjusted by altering polymerization conditions such as the amount of emulsifier that is used.

[Production Method of Particulate Polymer B]

The particulate polymer B having the make-up set forth above can be produced through polymerization of a monomer composition containing monomers such as previously described without any specific limitations. The proportions constituted by the monomers in the monomer composition are normally the same as the proportions constituted by the monomer units in the target polymer. No specific limitations are placed on the mode of polymerization of the particulate polymer B. For example, any of solution polymerization, suspension polymerization, bulk polymerization, and emulsion polymerization may be used. Moreover, the polymerization reaction may be addition polymerization such as ionic polymerization, radical polymerization, or living radical polymerization. Furthermore, an emulsifier, dispersant, polymerization initiator, polymerization aid, or the like used in polymerization may be the same as typically used, and the amount thereof may also be the same as typically used.

<Percentage Content of Particulate Polymers>

The content of the particulate polymer A (particulate polymer A1 or particulate polymer A2) in the binder composition for a non-aqueous secondary battery electrode according to this disclosure is preferably 50 mass % or more, and more preferably 55 mass % or more of the total content of the particulate polymer A and the particulate polymer B, and is preferably 90 mass % or less, more preferably 85 mass % or less, and even more preferably 80 mass % or less of the total content of the particulate polymer A and the particulate polymer B. When the percentage content of the particulate polymer A relative to the total content of the particulate polymer A and the particulate polymer B is at least the lower limit of any of the ranges set forth above, peel strength of an electrode produced using the binder composition can be further improved. Moreover, when the percentage content of the particulate polymer A is not more than the upper limit of any of the ranges set forth above, reduction in stability of a slurry composition containing the binder composition can be inhibited.

It should be noted that the binder composition for a non-aqueous secondary battery electrode according to this disclosure may further contain any polymer other than the above-described particulate polymers A and B as a binder.

<Dispersion Medium>

The dispersion medium contained in the binder composition for a non-aqueous secondary battery electrode according to this disclosure is not specifically limited and may, for example, be water. Moreover, the dispersion medium may be an aqueous solution of any compound or a mixed solution of water and a small amount of an organic solvent.

<Other Components>

The binder composition for a non-aqueous secondary battery electrode according to this disclosure may further contain components such as reinforcing materials, leveling agents, viscosity modifiers, and additives for electrolyte solution besides the components set forth above. These other components are not specifically limited so long as they do not affect the battery reactions and may be selected from commonly known components such as those described in WO 2012/115096 A1. One of such components may be used individually, or two or more of such components may be used in combination in a freely selected ratio.

<Production Method of Binder Composition>

The binder composition for a non-aqueous secondary battery electrode according to this disclosure may, for example, be a dispersion liquid containing the particulate polymer A that is obtained through polymerization and is used as a binder composition in this form, or may be a binder composition that is obtained through addition and mixing of a dispersion liquid containing the particulate polymer B, which is an optional component, and other components such as described above with respect to a dispersion liquid containing the particulate polymer A, but is not specifically limited thereto. In a case in which a dispersion liquid containing a particulate polymer is used in production of the binder composition, liquid content of the dispersion liquid may be used as the dispersion medium of the binder composition.

(Slurry Composition for Non-Aqueous Secondary Battery Electrode)

The slurry composition for a non-aqueous secondary battery electrode according to this disclosure contains an electrode active material and the binder composition set forth above, and may optionally further contain other components. In other words, the slurry composition for a non-aqueous secondary battery electrode according to this disclosure normally contains an electrode active material, the previously described particulate polymer A1 or particulate polymer A2, and a dispersion medium, and may optionally further contain the particulate polymer B, a conductive material, and other components. As a result of the slurry composition for a non-aqueous secondary battery electrode according to this disclosure containing the binder composition set forth above, the slurry composition enables good binding amongst an electrode active material and between the electrode active material and a current collector when used to form an electrode mixed material layer of an electrode. Consequently, an electrode having excellent peel strength can be obtained using the slurry composition for a non-aqueous secondary battery electrode according to this disclosure. Moreover, a non-aqueous secondary battery can be caused to display excellent battery characteristics, and particularly cycle characteristics, by using an electrode formed using a slurry composition containing the binder composition set forth above. Furthermore, a non-aqueous secondary battery can also be caused to display excellent rate characteristics in a case in which a binder composition containing the particulate polymer A2 is used.

Although the following describes, as one example, a case in which the slurry composition for a non-aqueous secondary battery electrode is a slurry composition for a lithium ion secondary battery negative electrode, this disclosure is not limited to the following example.

<Electrode Active Material>

The electrode active material is a substance that accepts and donates electrons in an electrode of a secondary battery. In the case of a negative electrode active material for a lithium ion secondary battery, a substance that occludes and releases lithium is normally used.

Specific examples of negative electrode active materials for lithium ion secondary batteries include a carbon-based negative electrode active material, a metal-based negative electrode active material, and a negative electrode active material that is a combination thereof.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

Examples of carbonaceous materials include graphitizing carbon and non-graphitizing carbon typified by glassy carbon that has a structure similar to an amorphous structure.

The graphitizing carbon may be a carbon material made using tar pitch obtained from petroleum or coal as a raw material. Specific examples of the graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferable. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

[Properties of Electrode Active Material]

The tap density of the electrode active material is preferably 1.1 g/cm³ or less, more preferably 1.05 g/cm³ or less, and even more preferably 1.03 g/cm³ or less. The electrode active material expands and contracts in accompaniment to charging and discharging, but when the tap density of the electrode active material is not more than any of the upper limits set forth above, it is possible to form an electrode that tends not to swell in association with charging and discharging. The tap density of the electrode active material is normally 0.7 g/cm³ or more, preferably 0.75 g/cm³ or more, and more preferably 0.8 g/cm³ or more.

An electrode active material having a low tap density normally has fine protrusions and recesses. Consequently, in a situation in which only a particulate polymer having a small particle diameter is used as a binder, it may not be possible to achieve good binding of the electrode active material because the particulate polymer may enter the recesses of the low-tap density electrode active material. On the other hand, in a situation in which only a particulate polymer having a large particle diameter is used as a binder, it may not be possible to achieve good binding of the electrode active material because contact area of the electrode active material and the particulate polymer is reduced. Accordingly, through inclusion of the particulate polymer B having a comparatively small volume average particle diameter, in addition to the particulate polymer A, in the slurry composition for a non-aqueous secondary battery electrode according to this disclosure, an electrode having sufficiently high peel strength can be formed even in a case in which an electrode active material having a low tap density is used.

<Binder Composition>

The binder composition that is used may be the previously described binder composition for a non-aqueous secondary battery electrode containing the particulate polymer A1 or particulate polymer A2.

Although no specific limitations are placed on the amount of the binder composition, the amount may be set such that the amount of the particulate polymer A (or the total amount of the particulate polymer A and the particulate polymer B in a case in which the binder composition further contains the particulate polymer B) in terms of solid content per 100 parts by mass of the electrode active material, for example, is at least 0.5 parts by mass and not more than 4.0 parts by mass.

<Conductive Material>

The conductive material ensures electrical contact amongst the electrode active material in an electrode mixed material layer. Known conductive materials can be used as the conductive material in the slurry composition according to this disclosure without any specific limitations. Specific examples of the conductive material include conductive carbon materials such as acetylene black, Ketjenblack® (Ketjenblack is a registered trademark in Japan, other countries, or both), furnace black, graphite, carbon fiber, carbon flakes, and carbon nanofibers (for example, carbon nanotubes or vapor-grown carbon fiber); and fibers and foils of various metals. Of these conductive materials, acetylene black Ketjenblack, and furnace black are preferable from a viewpoint of sufficiently improving rate characteristics while maintaining battery capacity of a secondary battery.

Although no specific limitations are placed on the amount of the conductive material, the amount of the conductive material per 100 parts by mass of the electrode active material is, for example, at least 0.1 parts by mass and not more than 10 parts by mass.

<Other Components>

Examples of other components that may be contained in the slurry composition include, but are not specifically limited to, the same other components as may be contained in the binder composition according to this disclosure. One of such other components may be used individually, or two or more of such other components may be used in combination in a freely selected ratio.

<Production of Slurry Composition>

The slurry composition set forth above can be produced by dispersing or dissolving the above-described components in a dispersion medium such as water. Specifically, the slurry composition can be produced by mixing the above-described components and the dispersion medium using a mixer such as a ball mill, a sand mill, a bead mill, a pigment disperser, a grinding machine, an ultrasonic disperser, a homogenizer, a planetary mixer, or a FILMIX. Mixing of the above-described components and the dispersion medium may normally be performed for a period of from 10 minutes to several hours in a temperature range of from room temperature to 80° C. The dispersion medium used in production of the slurry composition may be the same as used in the binder composition. Moreover, the dispersion medium used in production of the slurry composition may include dispersion medium that was contained in the binder composition.

(Electrode for Non-Aqueous Secondary Battery)

The electrode for a non-aqueous secondary battery according to this disclosure includes an electrode mixed material layer that is formed using the slurry composition for a non-aqueous secondary battery electrode set forth above, and normally includes a current collector and an electrode mixed material layer formed on the current collector. The electrode mixed material layer contains at least an electrode active material and a polymer originating from the particulate polymer A1 or particulate polymer A2. It should be noted that components contained in the electrode mixed material layer are components that are contained in the previously described slurry composition for a non-aqueous secondary battery electrode. Furthermore, the preferred ratio of these components in the electrode mixed material layer is the same as the preferred ratio of these components in the slurry composition. Although the particulate polymer A and the particulate polymer B are present in a particulate form in the slurry composition, these particulate polymers may be present in a particulate form or any other form in the electrode mixed material layer formed using the slurry composition.

In the electrode for a non-aqueous secondary battery according to this disclosure, there is good binding of the electrode mixed material layer and the current collector as a result of the slurry composition containing the binder composition for a non-aqueous secondary battery electrode according to this disclosure being used. Therefore, the electrode for a non-aqueous secondary battery according to this disclosure has excellent peel strength. Moreover, as a result of the electrode for a non-aqueous secondary battery according to this disclosure being formed using the slurry composition containing the binder composition for a non-aqueous secondary battery electrode according to this disclosure, a secondary battery having excellent battery characteristics such as cycle characteristics can be obtained using the electrode. Furthermore, a non-aqueous secondary battery can also be caused to display excellent rate characteristics in a case in which a binder composition containing the particulate polymer A2 is used.

<Production Method of Electrode>

The electrode for a non-aqueous secondary battery according to this disclosure is produced, for example, through a step of applying the previously described slurry composition onto the current collector (application step) and a step of drying the slurry composition that has been applied onto the current collector to form the electrode mixed material layer on the current collector (drying step).

[Application Step]

The previously described slurry composition can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of the aforementioned materials may be used individually, or two or more of the aforementioned materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, an electron beam, or the like. Through drying of the slurry composition on the current collector in this manner, an electrode mixed material layer can be formed on the current collector, and an electrode for a secondary battery that includes the current collector and the electrode mixed material layer can be obtained.

After the drying step, the electrode mixed material layer may be further subjected to a pressing process, such as mold pressing or roll pressing. The pressing process can improve close adherence between the electrode mixed material layer and the current collector. Furthermore, when the electrode mixed material layer contains a curable polymer, the polymer is preferably cured after the electrode mixed material layer has been formed.

(Non-Aqueous Secondary Battery)

The non-aqueous secondary battery according to this disclosure includes a positive electrode, a negative electrode, an electrolyte solution, and a separator, wherein the electrode for a non-aqueous secondary battery according to this disclosure is used as at least one of the positive electrode and the negative electrode. The non-aqueous secondary battery according to this disclosure has excellent battery characteristics such as cycle characteristics as a result of including the electrode for a non-aqueous secondary battery according to this disclosure. Furthermore, the non-aqueous secondary battery can also be caused to display excellent rate characteristics in a case in which a binder composition containing the particulate polymer A2 is used.

The secondary battery according to this disclosure is preferably a secondary battery in which the electrode for a secondary battery according to this disclosure is used as the negative electrode. Although the following describes, as one example, a case in which the secondary battery is a lithium ion secondary battery, this disclosure is not limited to the following example.

<Electrodes>

As explained above, the electrode for a non-aqueous secondary battery according to this disclosure is used as at least one of the positive electrode and the negative electrode. In other words, the positive electrode of the lithium ion secondary battery may be the electrode according to this disclosure and the negative electrode of the lithium ion secondary battery may be a known negative electrode other than the electrode according to this disclosure. Alternatively, the negative electrode of the lithium ion secondary battery may be the electrode according to this disclosure and the positive electrode of the lithium ion secondary battery may be a known positive electrode other than the electrode according to this disclosure. Further alternatively, the positive electrode and the negative electrode of the lithium ion secondary battery may both be the electrode according to this disclosure.

Note that an electrode obtained by forming an electrode mixed material layer on a current collector by a known production method may be used as a known electrode other than the electrode for a non-aqueous secondary battery according to this disclosure.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in that they easily dissolve in solvent and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent that is used in the electrolyte solution so long as the supporting electrolyte can dissolve therein. Suitable examples of organic solvents that may be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region.

The concentration of the electrolyte in the electrolyte solution may be adjusted as appropriate and is, for example, preferably 0.5 mass % to 15 mass %, more preferably 2 mass % to 13 mass %, and even more preferably 5 mass % to 10 mass %. Moreover, known additives such as vinylene carbonate, fluoroethylene carbonate, and ethyl methyl sulfone may be added to the electrolyte solution.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The secondary battery according to this disclosure may be produced by, for example, stacking the positive electrode and the negative electrode with the separator in-between, performing rolling, folding, or the like of the resultant laminate as necessary in accordance with the battery shape to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of this disclosure based on examples. However, this disclosure is not limited to the following examples. In the following description, "%" and "parts" used in expressing quantities are by mass, unless otherwise specified.

In the examples and comparative examples, the following methods were used to measure and evaluate the volume average particle diameter of various polymers, the degree of swelling in electrolyte solution of a particulate polymer, the tap density of a negative electrode active material, the stability of a slurry composition, the peel strength of a negative electrode, and the cycle characteristics and rate characteristics of a secondary battery.

<Volume Average Particle Diameter>

A laser diffraction particle diameter distribution analyzer (produced by Beckman Coulter, Inc.; product name: LS-230) was used to measure a particle diameter distribution (volume basis) with respect to a water dispersion of a polymer that had been adjusted to a solid content concentration of 0.1 mass %. A particle diameter was determined at which, in the obtained particle diameter distribution, cumulative volume calculated from the small diameter end of the distribution reached 50%, and this particle diameter was taken to be the volume average particle diameter (D50) of the polymer. This was performed for each type of polymer.

<Degree of Swelling in Electrolyte Solution>

A water dispersion containing a produced particulate polymer was added into a petri dish made of polytetrafluoroethylene and was dried for 48 hours at 25° C. to produce a polymer film as a specimen. The weight of the specimen was measured and was taken to be W0. Next, the specimen was immersed in an electrolyte solution (solvent:ethylene carbonate/diethyl carbonate/vinylene carbonate=68.5/30/1.5 (volume ratio); electrolyte:$LiPF_6$ of 1 M in concentration) for 72 hours at 60° C. Thereafter, the specimen was removed from the electrolyte solution, electrolyte solution on the surface of the specimen was wiped off, and the weight W1 of the specimen after immersion in electrolyte solution was measured.

The weights W0 and W1 were used to calculate the degree of swelling in electrolyte solution S (factor) by S=W1/W0.

<Tap Density>

The tap density of a negative electrode active material was measured using a Powder Tester® (Powder Tester is a registered trademark in Japan, other countries, or both) produced by Hosokawa Micron Corporation (product name: PT-D). Specifically, a powder of a negative electrode active material that had been loaded into a measurement vessel was first levelled off at the upper surface of the vessel. Next, a cap provided with the measurement device was attached to the measurement vessel and further negative electrode active material powder was added up to an upper edge of the attached cap. Tapping was then performed by repeatedly dropping the measurement vessel 180 times from a height of 1.8 cm. After this tapping, the cap was removed, and the negative electrode active material powder was once again levelled off at the upper surface of the vessel. The tapped and levelled sample was weighed, and the bulk density in this state was measured as the packed bulk density (i.e., the tap density (g/cm$^3$)).

<Stability>

M0 (g) of a produced slurry composition was passed through an 80-mesh filter and the time t (s) required to perform filtration to reach a residual amount M1 (g) (<M0) was measured. The filtration rate V (g/s) was calculated by the following equation.

$$V=(M0-M1)/t$$

The calculated filtration rate V was evaluated by the following standard. A larger value for the filtration rate V indicates that there are fewer aggregates in the slurry composition and that the slurry composition, therefore, has higher stability.

A: Filtration rate V of 0.8 g/s or more
B: Filtration rate V of at least 0.5 g/s and less than 0.8 g/s
C: Filtration rate V of at least 0.3 g/s and less than 0.5 g/s
D: Filtration rate V of less than 0.3 g/s <Peel Strength>

A produced negative electrode was cut out as a rectangular shape of 100 mm in length and 10 mm in width to obtain a specimen. The specimen was placed with the surface of the negative electrode mixed material layer underneath and cellophane tape was attached to the surface of the negative electrode mixed material layer. Tape prescribed by JIS Z1522 was used as the cellophane tape. Moreover, the cellophane tape was fixed to a test bed. Thereafter, one end of the current collector was pulled in an upward vertical direction at a pulling speed of 50 mm/min and the stress during peeling of the current collector was measured. This measurement was made three times and an average value of the stress was determined. The average value was taken to be the peel strength. A larger peel strength indicates greater binding force of the negative electrode mixed material layer to the current collector, and thus greater close adherence strength.

A: Peel strength of 24 N/m or more
B: Peel strength of at least 19 N/m and less than 24 N/m
C: Peel strength of at least 14 N/m and less than 19 N/m
D: Peel strength of less than 14 N/m <Cycle Characteristics>

A produced lithium ion secondary battery having a capacity of 800 mAh was left at rest for 24 hours in a 25° C. environment. Thereafter, the lithium ion secondary battery was subjected to a charge/discharge operation of charging to 4.35 V with a charge rate of 1 C and discharging to 3.0 V with a discharge rate of 1 C in a 25° C. environment, and the initial capacity C0 of the lithium ion secondary battery was measured. Additionally, a similar charge/discharge operation was repeated in a 45° C. environment and the capacity C1 of the lithium ion secondary battery after 300 cycles was measured. The capacity maintenance rate $\Delta C=(C1/C0)\times100$ (%) was calculated and was evaluated by the following standard. A higher value for the capacity maintenance rate indicates smaller reduction of discharge capacity and better cycle characteristics.

A: Capacity maintenance rate $\Delta C$ of 80% or more
B: Capacity maintenance rate $\Delta C$ of at least 75% and less than 80%
C: Capacity maintenance rate $\Delta C$ of at least 70% and less than 75%
D: Capacity maintenance rate $\Delta C$ of less than 70%

<Rate Characteristics>

A produced lithium ion secondary battery having a capacity of 800 mAh was left at rest for 24 hours in a 25° C. environment. Thereafter, the initial capacity C0' of the lithium ion secondary battery was measured by the same method as described in the "Cycle characteristics" section, and then the lithium ion secondary battery was fully charged to 4.35 V at 0.2 C by a constant-current constant-voltage method (cut-off condition: 0.02 C) in a 25° C. environment. The lithium ion secondary battery was subsequently constant-current discharged to 3.0 V at 0.2 C in a −10° C. environment, and the discharge capacity C1' in this discharging was measured. The lithium ion secondary battery was once again fully charged to 4.35 V by a constant-current constant-voltage method (cut-off condition: 0.02 C) in a 25° C. environment, and was then constant-current discharged to 3.0 V at 1 C in a −10° C. environment, and the discharge capacity C2' in this discharging was measured. The capacity maintenance rate $\Delta C'=(C2'/C1')\times100(\%)$ was calculated and was evaluated by the following standard. A higher value for the capacity maintenance rate indicates better rate characteristics (low-temperature characteristics).

A: Capacity maintenance rate $\Delta C'$ of 55% or more
B: Capacity maintenance rate $\Delta C'$ of at least 50% and less than 55%
C: Capacity maintenance rate $\Delta C'$ of at least 45% and less than 50%
D: Capacity maintenance rate $\Delta C'$ of less than 45%

Experiment 1

Example 1-1

<Production of Particulate Polymer A1>

A vessel X was charged with 5 parts of acrylic acid as a carboxylic acid group-containing monomer and 2.5 parts of sodium lauryl sulfate as an emulsifier (used after dilution to 20% with deionized water) and was stirred to cause emulsification. Thereafter, 95 parts in terms of solid content of a natural rubber latex containing particles of natural rubber (NR) having a volume average particle diameter of 0.88 μm (produced by Musashino Chemical Corporation; product name: LA Type; solid content concentration: 62%; isoprene unit content of polymer forming natural rubber particles in latex: 95% or more) was added into the vessel X, was left for 2 hours, and was then stirred. After sufficient stirring had been performed, 0.6 parts of tetraethylenepentamine and 0.6 parts of t-butyl hydrooxide were further added to the vessel X as polymerization initiators to initiate graft polymerization. A reaction temperature of 30° C. was maintained. Once 1.5 hours had passed from the start of graft polymerization, the temperature was increased to 70° C. and was maintained at 70° C. for 3 hours. Thereafter, the reaction was terminated once a polymerization addition rate of 97% or more was confirmed to yield a water dispersion (solid content concentration: 40%) containing a particulate polymer A1 in which a graft portion composed of only carboxylic acid group-containing monomer units had been introduced with respect to particles of natural rubber serving as a polymer of a trunk portion. The volume average particle diameter of the obtained particulate polymer A1 was measured, and the volume average particle diameter ratio Δd was calculated. The results are shown in Table 1.

<Production of Particulate Polymer B>

A mixture of 33 parts of 1,3-butadiene as an aliphatic conjugated diene monomer, 62 parts of styrene as an aromatic vinyl monomer, 4 parts of itaconic acid as a carboxylic acid group-containing monomer, 0.3 parts of sodium lauryl sulfate as an emulsifier, and 0.3 parts of tert-dodecyl mercaptan as a chain transfer agent was prepared in a vessel Y.

Addition of the mixture from the vessel Y to a pressure vessel Z was started and addition of 1 part of potassium persulfate to the pressure vessel Z as a polymerization initiator was simultaneously started so as to initiate polymerization. A reaction temperature of 75° C. was maintained.

Once 4 hours had passed from the start of polymerization (once 70% of the mixture had been added into the pressure vessel Z), 1 part of 2-hydroxyethyl acrylate was added into the pressure vessel Z as a hydroxy group-containing monomer over 1 hour and 30 minutes.

Addition of the entire amount of the aforementioned monomers was completed 5 hours and 30 minutes after the start of polymerization. Thereafter, the temperature was increased to 85° C. and a reaction was carried out for 6 hours.

When the polymerization conversion rate reached 97%, the reaction was terminated by cooling to yield a mixture containing a particulate polymer. The mixture containing the particulate polymer was adjusted to pH 8 through addition of 5% sodium hydroxide aqueous solution. Thereafter, unreacted monomers were removed by heated vacuum distillation. Cooling was then performed to obtain a water dispersion (solid content concentration: 40%) containing a particulate polymer B having a volume average particle diameter of 0.15 μm.

<Production of Binder Composition>

The water dispersion of the particulate polymer A1 and the water dispersion of the particulate polymer B were charged to a vessel such that the particulate polymer A1 and the particulate polymer B had a solid content ratio of particulate polymer A1:particulate polymer B=70:30. Stirring was then performed for 1 hour by a Three-One Motor to obtain a binder composition for a non-aqueous secondary battery electrode.

<Production of Slurry Composition>

A mixture was obtained by adding 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active materials, 1 part of carbon black (produced by TIMCAL; product name: Super C65) as a conductive material, and 1.2 parts in terms of solid content of a 2% aqueous solution of carboxymethyl cellulose (produced by Nippon Paper Chemicals Co., Ltd.; product name: MAC-350HC) as a viscosity modifier into a planetary mixer equipped with a disper blade. The solid content concentration of the resultant mixture was adjusted to 60% with deionized water and then mixing was performed for 60 minutes at 25° C. The solid content concentration was further adjusted to 52% with deionized water and further mixing was performed for 15 minutes at 25° C. to obtain a mixed liquid. Next, 2.2 parts in terms of solid content of the binder composition for a non-aqueous secondary battery electrode and deionized water were added to the obtained mixed liquid, and the final solid content concentration was adjusted to 48%. A further 10 minutes of mixing was performed and then defoaming treatment was performed under reduced pressure to yield a slurry composition for a non-aqueous secondary battery negative electrode having good fluidity.

Stability of the obtained slurry composition was evaluated. The results are shown in Table 1. Also note that the tap density of the negative electrode active material (mixture obtained by mixing the previously described artificial graphite and natural graphite in the previously described ratio) was separately measured. The results are shown in Table 1.

<Production of Negative Electrode>

The obtained slurry composition for a non-aqueous secondary battery negative electrode was applied onto copper foil (current collector) of 20 μm in thickness by a comma coater such as to have a film thickness after drying of approximately 150 μm. The applied slurry composition was dried by conveying the copper foil inside a 60° C. oven at a speed of 0.5 m/min over 2 minutes. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

Peel strength of the negative electrode was evaluated. The results are shown in Table 1.

<Production of Positive Electrode>

A slurry composition for a non-aqueous secondary battery positive electrode was obtained by using a planetary mixer to mix 100 parts of $LiCoO_2$ having a volume average particle diameter of 12 μm as a positive electrode active material, 2 parts of acetylene black (produced by Denki Kagaku Kogyo Kabushiki Kaisha; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration thereof was 70%.

The obtained slurry composition for a non-aqueous secondary battery positive electrode was applied onto aluminum foil (current collector) of 20 in thickness by a comma coater such as to have a film thickness after drying of approximately 150 μm. The applied slurry composition was dried by conveying the aluminum foil inside a 60° C. oven at a speed of 0.5 m/min over 2 minutes. Thereafter, heat treatment was performed for 2 minutes at 120° C. to obtain a positive electrode web.

The obtained positive electrode web was rolled by roll pressing to obtain a positive electrode including a positive electrode mixed material layer.

<Preparation of Separator>

A single layer separator made of polypropylene (produced by Celgard, LLC.; product name: Celgard 2500) was cut out to 120 cm×5.5 cm.

<Production of Secondary Battery>

The obtained post-pressing positive electrode was cut out as a rectangular shape of 49 cm×5 cm and was placed with the surface at the positive electrode mixed material layer side thereof on top. The separator cut out to 120 cm×5.5 cm was placed on the positive electrode mixed material layer such that the positive electrode was positioned at the left-hand side of the separator in terms of the longitudinal direction thereof. Next, the obtained post-pressing negative electrode was cut out as a rectangular shape of 50 cm×5.2 cm and was placed on the separator such that the surface at the negative electrode mixed material layer side of the negative electrode faced the separator and such that the negative electrode was positioned at the right-hand side of the separator in terms of the longitudinal direction thereof. The resultant laminate was wound using a winding machine to obtain a roll. This roll was enclosed in an aluminum packing case used as a battery case. The aluminum packing case was then injected with an electrolyte solution (solvent: ethylene carbonate/diethyl carbonate/vinylene carbonate=68.5/30/1.5 (volume ratio); electrolyte: $LiPF_6$ of 1 M in concentration) such that no air remained and was closed by heat sealing an opening thereof at 150° C. In this manner, a wound lithium ion secondary battery having a capacity of 800 mAh was produced.

Cycle characteristics of the lithium ion secondary battery were evaluated. The results are shown in Table 1.

Example 1-2

A binder composition, a slurry composition, a negative electrode, a positive electrode, a separator, and a secondary battery were produced in the same way as in Example 1-1 with the exception that a graft copolymer produced as described below was used as a particulate polymer A1. Evaluations were performed in the same way as in Example 1-1. The results are shown in Table 1.

<Production of Particulate Polymer A1>

Isoprene rubber (produced by Zeon Corporation; product name: Nipol IR2200) was dissolved in toluene to prepare an isoprene rubber solution having a concentration of 25%.

Next, a mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution having a total solid content concentration of 2%.

A tank was charged with 500 g of the isoprene rubber solution and 500 g of the aqueous solution, and preliminary mixing of these materials was performed by stirring. Next, a metering pump was used to transfer the resultant preliminary mixture from the tank to a Milder (produced by Pacific Machinery & Engineering Co., Ltd.; product name: MDN303V) at a rate of 100 g/min, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

The upper layer portion was then filtered through a 100-mesh screen to produce a latex containing polyisoprene (IR) particles. The resultant polyisoprene latex had a solid content concentration of 60% and a volume average particle diameter of 1.1 μm.

A water dispersion (solid content concentration: 40%) containing a particulate polymer A1 in which a graft portion composed of only carboxylic acid group-containing monomer units had been introduced with respect to polyisoprene particles serving as a polymer of a trunk portion was obtained through the same operations as in Example 1-1 with the exception that the obtained polyisoprene latex was used instead of the natural rubber latex and methacrylic acid was used instead of acrylic acid.

Example 1-3

A binder composition, a slurry composition, a negative electrode, a positive electrode, a separator, and a secondary battery were produced in the same way as in Example 1-1 with the exception that a graft copolymer produced as described below was used as a particulate polymer A1. Evaluations were performed in the same way as in Example 1-1. The results are shown in Table 1.

<Production of Particulate Polymer A1>

Butadiene rubber (produced by Zeon Corporation; product name: Nipol BR1220) was dissolved in toluene to prepare a butadiene rubber solution having a concentration of 25%.

Next, a mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution having a total solid content concentration of 2%.

A tank was charged with 500 g of the butadiene rubber solution and 500 g of the aqueous solution, and preliminary mixing of these materials was performed by stirring. Next, a metering pump was used to transfer the resultant preliminary mixture from the tank to a Milder (produced by Pacific Machinery & Engineering Co., Ltd.; product name: MDN303V) at a rate of 100 g/min, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

The upper layer portion was then filtered through a 100-mesh screen to produce a latex containing polybutadiene (BR) particles. The resultant polybutadiene latex had a solid content concentration of 60% and a volume average particle diameter of 1.03 μm.

A water dispersion (solid content concentration: 40%) containing a particulate polymer A1 in which a graft portion composed of only carboxylic acid group-containing monomer units had been introduced with respect to polybutadiene particles serving as a polymer of a trunk portion was obtained through the same operations as in Example 1-1 with the exception that the obtained polybutadiene latex was used instead of the natural rubber latex.

Example 1-4

A binder composition, a slurry composition, a negative electrode, a positive electrode, a separator, and a secondary battery were produced in the same way as in Example 1-1 with the exception that in production of the particulate polymer A1, 26 parts of methacrylic acid was used instead of acrylic acid and the amount of natural rubber latex was changed to 74 parts in terms of solid content. Evaluations were performed in the same way as in Example 1-1. The results are shown in Table 1.

Example 1-5

A binder composition, a slurry composition, a negative electrode, a positive electrode, a separator, and a secondary battery were produced in the same way as in Example 1-1 with the exception that in production of the particulate polymer A1, 1.5 parts of methacrylic acid was used instead of acrylic acid and the amount of natural rubber latex was changed to 98.5 parts in terms of solid content. Evaluations were performed in the same way as in Example 1-1. The results are shown in Table 1.

Example 1-6

A binder composition, a slurry composition, a negative electrode, a positive electrode, a separator, and a secondary battery were produced in the same way as in Example 1-1 with the exception that a graft copolymer produced as described below was used as a particulate polymer A1. Evaluations were performed in the same way as in Example 1-1. The results are shown in Table 1.

<Production of Particulate Polymer A1>

A natural rubber latex (produced by Musashino Chemical Corporation; product name: LA Type; isoprene unit content of polymer forming natural rubber particles in latex: 95% or more) was diluted to a solid content concentration of 10% and was left at rest for 30 days. Thereafter, a supernatant corresponding to 15% of the total amount was removed to obtain a latex containing natural rubber (NR) particles having a volume average particle diameter of 2.18 μm.

A water dispersion (solid content concentration: 40%) containing a particulate polymer A1 in which a graft portion composed of only carboxylic acid group-containing monomer units had been introduced with respect to natural rubber particles serving as a polymer of a trunk portion was obtained through the same operations as in Example 1-1 with the exception that 80 parts in terms of solid content of the obtained natural rubber latex was used, and 20 parts of methacrylic acid was used instead of acrylic acid.

Example 1-7

A binder composition, a slurry composition, a negative electrode, a positive electrode, a separator, and a secondary battery were produced in the same way as in Example 1-1 with the exception that only the particulate polymer A1 was used in production of the binder composition, without using the particulate polymer B. Evaluations were performed in the same way as in Example 1-1. The results are shown in Table 1.

Comparative Example 1-1

A binder composition, a slurry composition, a negative electrode, a positive electrode, a separator, and a secondary battery were produced in the same way as in Example 1-7 with the exception that in production of the particulate polymer A1, 35 parts of methacrylic acid was used instead of acrylic acid and the amount of natural rubber latex was changed to 65 parts in terms of solid content. Evaluations were performed in the same way as in Example 1-1. The results are shown in Table 1.

In Table 1, shown below:
"NR" indicates natural rubber;
"IR" indicates polyisoprene;
"BR" indicates polybutadiene;
"IP" indicates isoprene unit;
"BD" indicates 1,3-butadiene unit;
"AA" indicates acrylic acid unit;
"MAA" indicates methacrylic acid unit;
"ST" indicates styrene unit;
"IA" indicates itaconic acid unit;
"2-HEA" indicates 2-hydroxyethyl acrylate unit; and
"CB" indicates carbon black.

TABLE 1

| | | | | | Example 1-1 | Example 1-2 | Example 1-3 | Example 1-4 | Example 1-5 |
|---|---|---|---|---|---|---|---|---|---|
| Negative electrode active material | Tap density [g/cm³] | | | | 0.85 | 0.85 | 0.85 | 0.85 | 0.85 |
| | Amount [parts by mass] | | | | 95.6 | 95.6 | 95.6 | 95.6 | 95.6 |
| Binder composition | Particulate polymer A1 | Type of latex used as trunk portion of graft copolymer | | | NR | IR | BR | NR | NR |
| | | Make-up | Aliphatic conjugated diene monomer unit | IP [mass %] | ≥90.25 ≤95 | 95 | — | ≥70.3 ≤74 | ≥93.575 ≤98.5 |
| | | | | BD [mass %] | — | — | 95 | — | — |
| | | | Carboxylic acid group-containing monomer unit | AA [mass %] | 5 | — | 5 | — | — |
| | | | | MAA [mass %] | — | 5 | — | 26 | 1.5 |
| | | Volume average particle diameter | Pre-grafting [μm] | | 0.88 | 1.1 | 1.03 | 0.88 | 0.88 |
| | | | Post-grafting [μm] | | 0.9 | 1.13 | 1.05 | 0.94 | 0.89 |
| | | | Ratio Δd [—] | | 1.023 | 1.027 | 1.019 | 1.068 | 1.011 |
| | | Type of polymer | | | Graft copolymer | Graft copolymer | Graft copolymer | Graft copolymer | Graft copolymer |
| | Particulate polymer B | Make-up | Aliphatic conjugated diene monomer unit | BD [mass %] | 33 | 33 | 33 | 33 | 33 |
| | | | Aromatic vinyl monomer unit | ST [mass %] | 62 | 62 | 62 | 62 | 62 |
| | | | Optional monomer units | IA [mass %] | 4 | 4 | 4 | 4 | 4 |
| | | | | 2-HEA [mass %] | 1 | 1 | 1 | 1 | 1 |
| | | Volume average particle diameter [μm] | | | 0.15 | 0.15 | 0.15 | 0.15 | 0.15 |
| | Compounding ratio (particulate polymer A1/particulate polymer B) | | | | 70/30 | 70/30 | 70/30 | 70/30 | 70/30 |
| | Amount (in terms of solid content) [parts by mass] | | | | 2.2 | 2.2 | 2.2 | 2.2 | 2.2 |
| Conductive material | Type | | | | CB | CB | CB | CB | CB |
| | Amount [parts by mass] | | | | 1.0 | 1.0 | 1.0 | 1.0 | 1.0 |
| Evaluation | Slurry composition stability | | | | A | A | A | A | B |
| | Negative electrode peel strength | | | | A | B | B | B | A |
| | Secondary battery cycle characteristics | | | | A | B | B | B | B |

| | | | | | Example 1-6 | Example 1-7 | Comparative Example 1-1 |
|---|---|---|---|---|---|---|---|
| Negative electrode active material | Tap density [g/cm³] | | | | 0.85 | 0.85 | 0.85 |
| | Amount [parts by mass] | | | | 95.6 | 95.6 | 95.6 |
| Binder composition | Particulate polymer A1 | Type of latex used as trunk portion of graft copolymer | | | NR | NR | NR |
| | | Make-up | Aliphatic conjugated diene monomer unit | IP [mass %] | ≥76 ≤80 | ≥90.25 ≤95 | ≥61.75 ≤65 |
| | | | | BD [mass %] | — | — | — |
| | | | Carboxylic acid group-containing monomer unit | AA [mass %] | — | 5 | — |
| | | | | MAA [mass %] | 20 | — | 35 |

TABLE 1-continued

| | | | | | | | |
|---|---|---|---|---|---|---|---|
| | | Volume average particle diameter | | Pre-grafting [μm] | 2.18 | 0.88 | 0.88 |
| | | | | Post-grafting [μm] | 2.25 | 0.9 | 0.95 |
| | | | | Ratio Δd [—] | 1.032 | 1.023 | 1.080 |
| | | Type of polymer | | | Graft copolymer | Graft copolymer | Graft copolymer |
| | Particulate polymer B | Make-up | Aliphatic conjugated diene monomer unit | BD [mass %] | 33 | — | — |
| | | | Aromatic vinyl monomer unit | ST [mass %] | 62 | — | — |
| | | | Optional monomer units | IA [mass %] | 4 | — | — |
| | | | | 2-HEA [mass %] | 1 | — | — |
| | | Volume average particle diameter [μm] | | | 0.15 | — | — |
| | Compounding ratio (particulate polymer A1/particulate polymer B) | | | | 70/30 | — | — |
| | Amount (in terms of solid content) [parts by mass] | | | | 2.2 | 2.2 | 2.2 |
| Conductive material | Type | | | | CB | CB | CB |
| | Amount [parts by mass] | | | | 1.0 | 1.0 | 1.0 |
| Evaluation | Slurry composition stability | | | | A | B | B |
| | Negative electrode peel strength | | | | B | B | D |
| | Secondary battery cycle characteristics | | | | B | B | D |

It can be seen from Table 1 that in the case of Examples 1-1 to 1-7 in which particulate polymers A1 were used that each included an aliphatic conjugated diene monomer unit in a proportion of at least 70 mass % and not more than 99 mass % and a carboxylic acid group-containing monomer unit in a proportion of at least 1 mass % and not more than 30 mass %, slurry compositions having excellent stability, negative electrodes having excellent peel strength, and secondary batteries having excellent cycle characteristics were obtained. Moreover, it can be seen from Table 1 that in the case of Comparative Example 1-1 in which a particulate polymer A1 was used that had an aliphatic conjugated diene monomer unit content of less than 70 mass % and a carboxylic acid group-containing monomer unit content of more than 30 mass %, negative electrode peel strength and secondary battery cycle characteristics deteriorated.

Experiment 2

Example 2-1

<Production of Particulate Polymer A2>

A vessel X was charged with 20 parts of methyl methacrylate as a (meth)acrylic acid ester monomer and 2.5 parts of sodium lauryl sulfate as an emulsifier (used after dilution to 20% with deionized water) and was stirred to cause emulsification. Thereafter, 80 parts in terms of solid content of a natural rubber latex containing particles of natural rubber (NR) having a volume average particle diameter of 0.88 μm (produced by Musashino Chemical Corporation; product name: LA Type; solid content concentration: 62%; isoprene unit content of polymer forming natural rubber particles in latex: 95% or more) was added into the vessel X, was left for 2 hours, and was then stirred. After sufficient stirring had been performed, 0.6 parts of tetraethylenepentamine and 0.6 parts of t-butyl hydrooxide were further added to the vessel X as polymerization initiators to initiate graft polymerization. A reaction temperature of 28° C. was maintained. Once 9 hours had passed from the start of graft polymerization, it was confirmed that the polymerization addition rate had reached 97% or more, and the reaction was terminated to yield a water dispersion (solid content concentration: 40%) containing a particulate polymer A2 in which a graft portion composed of only (meth)acrylic acid ester monomer units had been introduced with respect to particles of natural rubber serving as a polymer of a trunk portion. The volume average particle diameter and degree of swelling in electrolyte solution of the obtained particulate polymer A2 were measured, and the volume average particle diameter ratio Δd was calculated. The results are shown in Table 2.

<Production of Particulate Polymer B>

A water dispersion (solid content concentration: 40%) containing a particulate polymer B having a volume average particle diameter of 0.15 was obtained in the same way as in Example 1-1.

<Production of Binder Composition>

The water dispersion of the particulate polymer A2 and the water dispersion of the particulate polymer B were charged to a vessel such that the particulate polymer A2 and the particulate polymer B had a solid content ratio of particulate polymer A2:particulate polymer B=60:40. Stirring was then performed for 1 hour by a Three-One Motor to obtain a binder composition for a non-aqueous secondary battery electrode.

<Production of Slurry Composition>

A mixture was obtained by adding 70 parts of artificial graphite (produced by Hitachi Chemical Co., Ltd.; product name: MAG-E) and 25.6 parts of natural graphite (produced by Nippon Carbon Co., Ltd.; product name: 604A) as negative electrode active materials, 1 part of carbon black (produced by TIMCAL; product name: Super C65) as a conductive material, and 1.2 parts in terms of solid content of a 2% aqueous solution of carboxymethyl cellulose (produced by Nippon Paper Chemicals Co., Ltd.; product name: MAC-350HC) as a viscosity modifier into a planetary mixer equipped with a disper blade. The solid content concentration of the resultant mixture was adjusted to 60% with deionized water and then mixing was performed for 60 minutes at 25° C. Next, the solid content concentration was further adjusted to 52% with deionized water and further mixing was performed for 15 minutes at 25° C. to obtain a mixed liquid. Next, 2.2 parts in terms of solid content of the binder composition for a non-aqueous secondary battery electrode and deionized water were added to the obtained mixed liquid, and the final solid content concentration was adjusted to 48%. A further 10 minutes of mixing was performed and then defoaming treatment was performed under reduced pressure to yield a slurry composition for a non-aqueous secondary battery negative electrode having good fluidity.

Stability of the obtained slurry composition was evaluated. The results are shown in Table 2. Also note that the tap density of the negative electrode active material (mixture obtained by mixing the previously described artificial graphite and natural graphite in the previously described ratio) was separately measured. The results are shown in Table 2.

<Production of Negative Electrode>

The obtained slurry composition for a non-aqueous secondary battery negative electrode was applied onto copper foil (current collector) of 20 μm in thickness by a comma coater such as to have a film thickness after drying of approximately 150 μm. The applied slurry composition was dried by conveying the copper foil inside a 60° C. oven at a speed of 0.5 m/min over 2 minutes. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

Peel strength of the negative electrode was evaluated. The results are shown in Table 2.

<Production of Positive Electrode>

A positive electrode including a positive electrode mixed material layer was obtained in the same way as in Example 1-1.

<Preparation of Separator>

A single layer separator made of polypropylene (produced by Celgard, LLC.; product name: Celgard 2500) was cut out to 120 cm×5.5 cm.

<Production of Secondary Battery>

The obtained post-pressing positive electrode was cut out as a rectangular shape of 49 cm×5 cm and was placed with the surface at the positive electrode mixed material layer side thereof on top. The separator cut out to 120 cm×5.5 cm was placed on the positive electrode mixed material layer such that the positive electrode was positioned at the left-hand side of the separator in terms of the longitudinal direction thereof. Next, the obtained post-pressing negative electrode was cut out as a rectangular shape of 50 cm×5.2 cm and was placed on the separator such that the surface at the negative electrode mixed material layer side of the negative electrode faced the separator and such that the negative electrode was positioned at the right-hand side of the separator in terms of the longitudinal direction thereof. The resultant laminate was wound by a winding machine to obtain a roll. This roll was enclosed in an aluminum packing case used as a battery case. The aluminum packing case was then injected with an electrolyte solution (solvent: ethylene carbonate/diethyl carbonate/vinylene carbonate=68.5/30/1.5 (volume ratio); electrolyte: LiPF$_6$ of 1 M in concentration) such that no air remained and was closed by heat sealing an opening thereof at 150° C. In this manner, a wound lithium ion secondary battery having a capacity of 800 mAh was produced.

Cycle characteristics and rate characteristics of the lithium ion secondary battery were evaluated. The results are shown in Table 2.

Example 2-2

A binder composition, a slurry composition, a negative electrode, a positive electrode, a separator, and a secondary battery were produced in the same way as in Example 2-1 with the exception that a graft copolymer produced as described below was used as a particulate polymer A2. Evaluations were performed in the same way as in Example 2-1. The results are shown in Table 2.

<Production of Particulate Polymer A2>

Isoprene rubber (produced by Zeon Corporation; product name: Nipol IR2200) was dissolved in toluene to prepare an isoprene rubber solution having a concentration of 25%.

Next, a mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution having a total solid content concentration of 2%.

A tank was charged with 500 g of the isoprene rubber solution and 500 g of the aqueous solution, and preliminary mixing of these materials was performed by stirring. Next, a metering pump was used to transfer the resultant preliminary mixture from the tank to a Milder (produced by Pacific Machinery & Engineering Co., Ltd.; product name: MDN303V) at a rate of 100 g/min, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

The upper layer portion was then filtered through a 100-mesh screen to produce a latex containing polyisoprene (IR) particles. The resultant polyisoprene latex had a solid content concentration of 60% and a volume average particle diameter of 1.1 μm.

A water dispersion (solid content concentration: 40%) containing a particulate polymer A2 in which a graft portion composed of only (meth)acrylic acid ester monomer units had been introduced with respect to polyisoprene particles serving as a polymer of a trunk portion was obtained through the same operations as in Example 2-1 with the exception that the obtained polyisoprene latex was used instead of the natural rubber latex.

Example 2-3

A binder composition, a slurry composition, a negative electrode, a positive electrode, a separator, and a secondary battery were produced in the same way as in Example 2-1 with the exception that a graft copolymer produced as described below was used as a particulate polymer A2. Evaluations were performed in the same way as in Example 2-1. The results are shown in Table 2.

<Production of Particulate Polymer A2>

Butadiene rubber (produced by Zeon Corporation; product name: Nipol BR1220) was dissolved in toluene to prepare a butadiene rubber solution having a concentration of 25%.

Next, a mixture of sodium linear alkylbenzene sulfonate, sodium alkyl polyoxyethylene sulfonate, and sodium alkyl polyoxyethylene sulfosuccinate mixed in a ratio of 1:1:1 was dissolved in deionized water to produce an aqueous solution having a total solid content concentration of 2%.

A tank was charged with 500 g of the butadiene rubber solution and 500 g of the aqueous solution, and preliminary mixing of these materials was performed by stirring. Next, a metering pump was used to transfer the resultant preliminary mixture from the tank to a Milder (produced by Pacific Machinery & Engineering Co., Ltd.; product name: MDN303V) at a rate of 100 g/min, and the preliminary mixture was stirred at a rotation speed of 20,000 rpm to cause emulsification (phase-inversion emulsification).

Next, toluene in the resultant emulsion was removed by evaporation under reduced pressure in a rotary evaporator. The emulsion was subsequently left to separate for 1 day in a chromatographic column equipped with a stop-cock, and a lower layer portion was removed after separation to perform concentration.

The upper layer portion was then filtered through a 100-mesh screen to produce a latex containing polybutadiene (BR) particles. The resultant polybutadiene latex had a solid content concentration of 60% and a volume average particle diameter of 1.02 μm.

A water dispersion (solid content concentration: 40%) containing a particulate polymer A2 in which a graft portion composed of only (meth)acrylic acid ester monomer units had been introduced with respect to polybutadiene particles serving as a polymer of a trunk portion was obtained through the same operations as in Example 2-1 with the exception that the obtained polybutadiene latex was used instead of the natural rubber latex.

Example 2-4

A binder composition, a slurry composition, a negative electrode, a positive electrode, a separator, and a secondary battery were produced in the same way as in Example 2-1 with the exception that in production of the particulate polymer A2, the amount of methyl methacrylate was changed to 26 parts and the amount of natural rubber latex was changed to 74 parts in terms of solid content. Evaluations were performed in the same way as in Example 2-1. The results are shown in Table 2.

Example 2-5

A binder composition, a slurry composition, a negative electrode, a positive electrode, a separator, and a secondary battery were produced in the same way as in Example 2-1 with the exception that in production of the particulate polymer A2, the amount of methyl methacrylate was changed to 8 parts and the amount of natural rubber latex was changed to 92 parts in terms of solid content. Evaluations were performed in the same way as in Example 2-1. The results are shown in Table 2.

Example 2-6

A binder composition, a slurry composition, a negative electrode, a positive electrode, a separator, and a secondary battery were produced in the same way as in Example 2-1 with the exception that a graft copolymer produced as described below was used as a particulate polymer A2. Evaluations were performed in the same way as in Example 2-1. The results are shown in Table 2.
<Production of Particulate Polymer A2>

A natural rubber latex (produced by Musashino Chemical Corporation; product name: LA Type; isoprene unit content of polymer forming natural rubber particles in latex: 95% or more) was diluted to a solid content concentration of 10% and was left at rest for 30 days. Thereafter, a supernatant corresponding to 15% of the total amount was removed to obtain a latex containing natural rubber (NR) particles having a volume average particle diameter of 2.15 μm.

A water dispersion (solid content concentration: 40%) containing a particulate polymer A2 in which a graft portion composed of only (meth)acrylic acid ester monomer units had been introduced with respect to natural rubber particles serving as a polymer of a trunk portion was obtained through the same operations as in Example 2-1 with the exception that the obtained natural rubber latex was used.

Example 2-7

A binder composition, a slurry composition, a negative electrode, a positive electrode, a separator, and a secondary battery were produced in the same way as in Example 2-1 with the exception that only the particulate polymer A2 was used in production of the binder composition, without using the particulate polymer B. Evaluations were performed in the same way as in Example 2-1. The results are shown in Table 2.

Comparative Example 2-1

A binder composition, a slurry composition, a negative electrode, a positive electrode, a separator, and a secondary battery were produced in the same way as in Example 2-7 with the exception that in production of the particulate polymer A2, the amount of methyl methacrylate was changed to 35 parts and the amount of natural rubber latex was changed to 65 parts in terms of solid content. Evaluations were performed in the same way as in Example 2-1. The results are shown in Table 2.

Comparative Example 2-2

A binder composition, a slurry composition, a negative electrode, a positive electrode, a separator, and a secondary battery were produced in the same way as in Example 2-7 with the exception that a natural rubber latex containing particles of natural rubber (NR) having a volume average particle diameter of 0.88 μm that had not been subjected to graft portion introduction (produced by Musashino Chemical Corporation; product name: LA Type; solid content concentration: 62%; isoprene unit content of polymer forming natural rubber particles in latex: 95% or more) was used instead of the water dispersion of the particulate polymer A2. Evaluations were performed in the same way as in Example 2-1. The results are shown in Table 2.

In Table 2, shown below:
"NR" indicates natural rubber;
"IR" indicates polyisoprene;
"BR" indicates polybutadiene;
"IP" indicates isoprene unit;
"BD" indicates 1,3-butadiene unit;
"MMA" indicates methyl methacrylate unit;
"ST" indicates styrene unit;
"IA" indicates itaconic acid unit;
"2-HEA" indicates 2-hydroxyethyl acrylate unit; and
"CB" indicates carbon black.

TABLE 2

|  |  | Example 2-1 | Example 2-2 | Example 2-3 | Example 2-4 | Example 2-5 |
|---|---|---|---|---|---|---|
| Negative electrode active | Tap density [g/cm³] | 0.85 | 0.85 | 0.85 | 0.85 | 0.85 |
|  | Amount [parts by mass] | 95.6 | 95.6 | 95.6 | 95.6 | 95.6 |

TABLE 2-continued

|  |  |  |  |  |  |  |  |  |
|---|---|---|---|---|---|---|---|---|
| Binder composition | Particulate polymer A2 | Type of latex used as trunk portion of graft copolymer |  | NR | IR | BR | NR | NR |
|  |  | Make-up | Aliphatic conjugated diene monomer unit | IP [mass %] | ≥76 ≤80 | 80 | — | ≥70.3 ≤74 | ≥87.4 ≤92 |
|  |  |  |  | BD [mass %] | — | — | 80 | — | — |
|  |  |  | (Meth)acrylic acid ester monomer unit | MMA [mass %] | 20 | 20 | 20 | 26 | 8 |
|  |  | Degree of swelling in electrolyte solution [factor] |  | 6.0 | 6.0 | 6.3 | 6.9 | 3.0 |
|  |  | Volume average particle diameter [μm] |  | 0.92 | 1.2 | 1.1 | 0.93 | 0.89 |
|  |  | Volume average particle diameter ratio Δd [—] |  | 1.045 | 1.091 | 1.078 | 1.057 | 1.011 |
|  |  | Type of polymer |  | Graft copolymer | Graft copolymer | Graft copolymer | Graft copolymer | Graft copolymer |
|  | Particulate polymer B | Make-up | Aliphatic conjugated diene monomer unit | BD [mass %] | 33 | 33 | 33 | 33 | 33 |
|  |  |  | Aromatic vinyl monomer unit | ST [mass %] | 62 | 62 | 62 | 62 | 62 |
|  |  |  | Optional monomer units | IA [mass %] | 4 | 4 | 4 | 4 | 4 |
|  |  |  |  | 2-HEA [mass %] | 1 | 1 | 1 | 1 | 1 |
|  |  | Volume average particle diameter [μm] |  | 0.15 | 0.15 | 0.15 | 0.15 | 0.15 |
|  | Compounding ratio (particulate polymer A2/particulate polymer B) |  |  | 60/40 | 60/40 | 60/40 | 60/40 | 60/40 |
|  | Amount (in terms of solid content) [parts by mass] |  |  | 2.2 | 2.2 | 2.2 | 2.2 | 2.2 |
| Conductive material | Type |  |  | CB | CB | CB | CB | CB |
|  | Amount [parts by mass] |  |  | 1.0 | 1.0 | 1.0 | 1.0 | 1.0 |
| Evaluation | Slurry composition stability |  |  | A | A | A | A | B |
|  | Negative electrode peel strength |  |  | A | B | B | A | A |
|  | Secondary battery cycle characteristics |  |  | A | B | B | B | B |
|  | Secondary battery rate characteristics |  |  | A | B | B | B | B |

|  |  |  |  |  | Example 2-6 | Example 2-7 | Comparative Example 2-1 | Comparative Example 2-2 |
|---|---|---|---|---|---|---|---|---|
| Negative electrode active | Tap density [g/cm³] |  |  |  | 0.85 | 0.85 | 0.85 | 0.85 |
|  | Amount [parts by mass] |  |  |  | 95.6 | 95.6 | 95.6 | 95.6 |
| Binder composition | Particulate polymer A2 | Type of latex used as trunk portion of graft copolymer |  |  | NR | NR | NR | NR (*) |
|  |  | Make-up | Aliphatic conjugated diene monomer unit | IP [mass %] | ≥76 ≤80 | ≥76 ≤80 | ≥61.75 ≤65 | ≥95 ≤100 |
|  |  |  |  | BD [mass %] | — | — | — | — |
|  |  |  | (Meth)acrylic acid ester monomer unit | MMA [mass %] | 20 | 20 | 35 | — |
|  |  | Degree of swelling in electrolyte solution [factor] |  |  | 6.0 | 6.0 | 8.3 | 1.2 |
|  |  | Volume average particle diameter [μm] |  |  | 2.3 | 0.92 | 0.94 | 0.88 |
|  |  | Volume average particle diameter ratio Δd [—] |  |  | 1.070 | 1.045 | 1.068 | — |
|  |  | Type of polymer |  |  | Graft copolymer | Graft copolymer | Graft copolymer | — |
|  | Particulate polymer B | Make-up | Aliphatic conjugated diene monomer unit | BD [mass %] | 33 | — | — | — |
|  |  |  | Aromatic vinyl monomer unit | ST [mass %] | 62 | — | — | — |
|  |  |  | Optional monomer units | IA [mass %] | 4 | — | — | — |
|  |  |  |  | 2-HEA [mass %] | 1 | — | — | — |
|  |  | Volume average particle diameter [μm] |  |  | 0.15 | — | — | — |
|  | Compounding ratio (particulate polymer A2/particulate polymer B) |  |  |  | 60/40 | — | — | — |
|  | Amount (in terms of solid content) [parts by mass] |  |  |  | 2.2 | 2.2 | 2.2 | 2.2 |
| Conductive material | Type |  |  |  | CB | CB | CB | CB |
|  | Amount [parts by mass] |  |  |  | 1.0 | 1.0 | 1.0 | 1.0 |
| Evaluation | Slurry composition stability |  |  |  | A | B | B | D |
|  | Negative electrode peel strength |  |  |  | B | B | B | B |
|  | Secondary battery cycle characteristics |  |  |  | B | B | D | B |
|  | Secondary battery rate characteristics |  |  |  | B | B | D | D |

(*) Graft polymerization not performed in Comparative Example 2-2

It can be seen from Table 2 that in the case of Examples 2-1 to 2-7 in which particulate polymers A2 were used that each included an aliphatic conjugated diene monomer unit in a proportion of at least 70 mass % and not more than 95 mass % and a (meth)acrylic acid ester monomer unit in a proportion of at least 1 mass % and not more than 30 mass %, and that each had a degree of swelling in electrolyte solution of at least a factor of 1.2 and not more than a factor of 7.0, slurry compositions having excellent stability, negative electrodes having excellent peel strength, and secondary batteries having excellent cycle characteristics and rate characteristics were obtained. Moreover, it can be seen from Table 2 that in the case of Comparative Example 2-1 in which a particulate polymer A2 was used that had an aliphatic conjugated diene monomer unit content of less than 70 mass %, a (meth)acrylic acid ester monomer unit content of more than 30 mass %, and a degree of swelling in electrolyte solution of more than a factor of 7.0, secondary battery cycle characteristics and rate characteristics deteriorated. Furthermore, in the case of Comparative Example 2-2 in which a particulate polymer A2 was used that had a (meth)acrylic acid ester monomer unit content of less than 1 mass %, it can be seen that slurry composition stability and secondary battery rate characteristics deteriorated.

INDUSTRIAL APPLICABILITY

According to this disclosure, it is possible to provide a binder composition for a non-aqueous secondary battery electrode and a slurry composition for a non-aqueous secondary battery electrode that enable formation of an electrode for a non-aqueous secondary battery that has excellent peel strength and can cause a non-aqueous secondary battery to display excellent cycle characteristics.

Moreover, according to this disclosure, it is possible to provide an electrode for a non-aqueous secondary battery that has excellent peel strength and can cause a non-aqueous secondary battery to display excellent cycle characteristics.

Furthermore, according to this disclosure, it is possible to provide a non-aqueous secondary battery having excellent battery characteristics such as cycle characteristics.

The invention claimed is:

1. A binder composition for a non-aqueous secondary battery electrode, comprising
a particulate polymer A1 and a particulate polymer B, wherein
the particulate polymer A1 includes isoprene unit in a proportion of at least 90 mass % and not more than 99 mass % and a carboxylic acid group-containing monomer unit in a proportion of at least 1 mass % and not more than 5 mass %,
the particulate polymer A1 is a graft copolymer,
a graft portion of the particulate polymer A1 is composed of only carboxylic acid group-containing monomer units,
a polymer forming a trunk portion of the particulate polymer A1 is natural rubber and is free of styrene unit,
the particulate polymer A1 has a volume average particle diameter of at least 0.6 µm and not more than 2.5 µm,
the particulate polymer B includes an aliphatic conjugated diene monomer unit as a repeating unit and further contains either or both of an aromatic vinyl monomer unit and a monomer unit other than the aliphatic conjugated diene monomer unit and the aromatic vinyl monomer unit,
the particulate polymer B has a volume average particle diameter of at least 0.01 µm and less than 0.6 µm, and
content of the particulate polymer A1 is at least 50 mass % and not more than 90 mass % of total content of the particulate polymer A1 and the particulate polymer B.

2. A binder composition for a non-aqueous secondary battery electrode according to claim 1, further comprising
a particulate polymer A2, wherein
the particulate polymer A2 includes an aliphatic conjugated diene monomer unit in a proportion of at least 70 mass % and not more than 95 mass % and a (meth)acrylic acid ester monomer unit in a proportion of at least 1 mass % and not more than 30 mass %, and
the particulate polymer A2 has a degree of swelling in electrolyte solution of at least a factor of 1.2 and not more than a factor of 7.0.

3. The binder composition for a non-aqueous secondary battery electrode according to claim 2, wherein
the particulate polymer A2 is a graft copolymer.

4. The binder composition for a non-aqueous secondary battery electrode according to claim 2, wherein
the particulate polymer A2 has a volume average particle diameter of at least 0.6 µm and not more than 2.5 µm.

5. The binder composition for a non-aqueous secondary battery electrode according to claim 4, further comprising
a particulate polymer B, wherein
the particulate polymer B has a volume average particle diameter of at least 0.01 µm and less than 0.6 µm.

6. The binder composition for a non-aqueous secondary battery electrode according to claim 5, wherein
content of the particulate polymer A2 is at least 50 mass % and not more than 90 mass % of total content of the particulate polymer A2 and the particulate polymer B.

7. A slurry composition for a non-aqueous secondary battery electrode, comprising:
an electrode active material; and
the binder composition for a non-aqueous secondary battery electrode according to claim 1.

8. The slurry composition for a non-aqueous secondary battery electrode according to claim 7, wherein
the electrode active material has a tap density of 1.1 g/cm$^3$ or less.

9. The slurry composition for a non-aqueous secondary battery electrode according to claim 7, further comprising
a conductive material.

10. An electrode for a non-aqueous secondary battery, comprising
an electrode mixed material layer formed using the slurry composition for a non-aqueous secondary battery electrode according to claim 7.

11. A non-aqueous secondary battery comprising:
a positive electrode;
a negative electrode;
an electrolyte solution; and
a separator, wherein
at least one of the positive electrode and the negative electrode is the electrode for a non-aqueous secondary battery according to claim 10.

12. A slurry composition for a non-aqueous secondary battery electrode, comprising:
an electrode active material; and
the binder composition for a non-aqueous secondary battery electrode according to claim 2.

13. The slurry composition for a non-aqueous secondary battery electrode according to claim 12, wherein
the electrode active material has a tap density of 1.1 g/cm$^3$ or less.

14. The slurry composition for a non-aqueous secondary battery electrode according to claim 12, further comprising
a conductive material.

15. An electrode for a non-aqueous secondary battery, comprising
an electrode mixed material layer formed using the slurry composition for a non-aqueous secondary battery electrode according to claim 12.

16. The binder composition for a non-aqueous secondary battery electrode according to claim 1, wherein content of the particulate polymer A1 is at least 50 mass % and not more than 70 mass % of total content of the particulate polymer A1 and the particulate polymer B.

* * * * *